US010257767B2

(12) United States Patent
Schwartz et al.

(10) Patent No.: US 10,257,767 B2
(45) Date of Patent: Apr. 9, 2019

(54) MOVING CELLULAR COMMUNICATION SYSTEM OPERATIVE IN AN EMERGENCY MODE

(71) Applicant: ELTA SYSTEMS LTD., Ashdod (IL)

(72) Inventors: Adi Schwartz, Holon (IL); Yaakov Shoshan, Ashkelon (IL); Itay Sherman, Hod Hasharon (IL); Udi Weinsberg, Ashdod (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 15/863,151

(22) Filed: Jan. 5, 2018

(65) Prior Publication Data

US 2018/0279106 A1 Sep. 27, 2018

Related U.S. Application Data

(63) Continuation of application No. 15/373,549, filed on Dec. 9, 2016, now Pat. No. 9,936,367, which is a
(Continued)

(51) Int. Cl.
*H04W 4/90* (2018.01)
*H04W 40/22* (2009.01)
(Continued)

(52) U.S. Cl.
CPC .......... *H04W 40/22* (2013.01); *H04B 7/1555* (2013.01); *H04B 7/15542* (2013.01);
(Continued)

(58) Field of Classification Search
CPC ...... H04W 40/22; H04W 4/22; H04B 7/1555; H04B 7/2606
(Continued)

(56) References Cited

U.S. PATENT DOCUMENTS 5,657,317 A 8/1997 Mahany et al.
5,729,826 A 3/1998 Gavrilovich
(Continued)

FOREIGN PATENT DOCUMENTS

JP 2010-233184 A 10/2010
KR 2010-0113609 A 10/2010
(Continued)

OTHER PUBLICATIONS

3GPP TR 36.806; V9.0.0; (Mar. 2010).
(Continued)

*Primary Examiner* — Congvan Tran
(74) *Attorney, Agent, or Firm* — Oliff PLC

(57) ABSTRACT

A method operative in conjunction with a cellular communication network having a core element and comprising providing moving relays including base and mobile station functionality and a relay resource manager, all co-located, including providing an emergency moving relay from among the moving relays further including a simulated stationary network that includes a simulated IP connectivity gateway communicating with a simulated mobility management entity. The simulated stationary network simulates a stationary network's operation; the emergency moving relay being a root of a sub tree that includes moving relays and mobile stations, and is configured to utilize its mobile and base station functionalities and relay resource manager for operating in:
(i) normal mode: emergency moving relay communicates with other relays in the network and with the stationary network;
(ii) emergency mode, including, in response to an emergency event, finding new networks to connect to.

21 Claims, 16 Drawing Sheets

Related U.S. Application Data continuation of application No. 14/950,736, filed on Nov. 24, 2015, now Pat. No. 9,544,830, which is a continuation of application No. 14/004,291, filed as application No. PCT/IL2012/050082 on Mar. 8, 2012, now Pat. No. 9,220,048.

(60) Provisional application No. 61/451,344, filed on Mar. 10, 2011.

(51) Int. Cl.

| | | |
|---|---|---|
| *H04W 76/10* | (2018.01) | |
| *H04W 76/12* | (2018.01) | |
| *H04W 8/26* | (2009.01) | |
| *H04W 72/04* | (2009.01) | |
| *H04W 28/02* | (2009.01) | |
| *H04W 36/04* | (2009.01) | |
| *H04W 72/02* | (2009.01) | |
| *H04B 7/155* | (2006.01) | |
| *H04B 7/26* | (2006.01) | |
| *H04W 72/00* | (2009.01) | |
| *H04W 8/08* | (2009.01) | |
| *H04J 11/00* | (2006.01) | |
| *H04L 1/00* | (2006.01) | |
| *H04W 4/04* | (2009.01) | |
| *H04W 28/14* | (2009.01) | |
| *H04W 40/02* | (2009.01) | |
| *H04W 76/11* | (2018.01) | |
| *H04W 4/40* | (2018.01) | |
| *H04L 29/12* | (2006.01) | |
| *H04W 40/00* | (2009.01) | |
| *H04W 80/04* | (2009.01) | |
| *H04W 84/00* | (2009.01) | |
| *H04W 84/04* | (2009.01) | |
| *H04W 88/04* | (2009.01) | |
| *H04W 88/08* | (2009.01) | |
| *H04W 88/16* | (2009.01) | |

(52) U.S. Cl.
CPC .......... *H04B 7/2606* (2013.01); *H04J 11/005* (2013.01); *H04J 11/0056* (2013.01); *H04L 1/0018* (2013.01); *H04L 61/2517* (2013.01); *H04W 4/046* (2013.01); *H04W 4/40* (2018.02); *H04W 4/90* (2018.02); *H04W 8/085* (2013.01); *H04W 8/26* (2013.01); *H04W 28/0215* (2013.01); *H04W 28/0268* (2013.01); *H04W 28/14* (2013.01); *H04W 36/04* (2013.01); *H04W 40/02* (2013.01); *H04W 72/005* (2013.01); *H04W 72/02* (2013.01); *H04W 72/042* (2013.01); *H04W 72/0413* (2013.01); *H04W 72/0453* (2013.01); *H04W 76/10* (2018.02); *H04W 76/11* (2018.02); *H04W 76/12* (2018.02); *H04L 2212/00* (2013.01); *H04W 40/00* (2013.01); *H04W 72/00* (2013.01); *H04W 80/04* (2013.01); *H04W 84/005* (2013.01); *H04W 84/045* (2013.01); *H04W 84/047* (2013.01); *H04W 88/04* (2013.01); *H04W 88/08* (2013.01); *H04W 88/16* (2013.01)

(58) Field of Classification Search
USPC .......... 455/404.1, 404.2, 403, 434, 436–439, 455/445, 446, 521, 552.1, 421, 567; 370/331–332
See application file for complete search history.

(56) References Cited

U.S. PATENT DOCUMENTS

| | | |
|---|---|---|
| 7,103,644 B1 | 9/2006 | Zhang et al. |
| 8,897,262 B2 | 11/2014 | Van Phan et al. |
| 8,983,463 B2 | 3/2015 | Yoshimura et al. |
| 9,037,075 B2 | 5/2015 | Takano et al. |
| 9,295,025 B2 | 3/2016 | Fukuta |
| 2005/0197122 A1 | 9/2005 | Sliva |
| 2008/0188231 A1* | 8/2008 | Zhu .................. H04W 72/1252 455/450 |
| 2010/0120392 A1 | 5/2010 | Youn et al. |
| 2010/0234071 A1 | 9/2010 | Shabtay et al. |
| 2010/0260113 A1 | 10/2010 | Liu et al. |
| 2010/0302999 A1* | 12/2010 | Hui .................. H04B 7/155 370/315 |
| 2011/0244851 A1* | 10/2011 | Gunnarsson ............ H04W 8/26 455/423 |
| 2013/0059585 A1* | 3/2013 | Giloh .................. H04L 45/54 455/436 |
| 2013/0229939 A1* | 9/2013 | Teyeb .................. H04W 36/30 370/252 |
| 2014/0071884 A1 | 3/2014 | Sherman |
| 2014/0087736 A1 | 3/2014 | Shoshan et al. |
| 2014/0192781 A1 | 7/2014 | Teyeb et al. |
| 2015/0156708 A1 | 6/2015 | Tietz et al. |

FOREIGN PATENT DOCUMENTS

| | | |
|---|---|---|
| WO | 2009/097458 A1 | 8/2009 |
| WO | 2009/112809 A1 | 9/2009 |
| WO | 2011/092698 A1 | 8/2011 |
| WO | 2012/070044 A1 | 5/2012 |
| WO | 2012/070045 A2 | 5/2012 |
| WO | 2012/070048 A1 | 5/2012 |
| WO | 2012/070049 A1 | 5/2012 |
| WO | 2012/120510 A2 | 9/2012 |
| WO | 2012/120515 A2 | 9/2012 |

OTHER PUBLICATIONS

3GPP Specifications, retrieved May 2015.
Multimedia Broadcast Multicast Service; pp. 1-3; Nov. 23, 2011.
Multicast-broadcast single-frequency network; pp. 1-2; Jan. 31, 2012.

\* cited by examiner

MOVING CELLULAR COMMUNICATION SYSTEM OPERATIVE IN AN EMERGENCY MODE

REFERENCE TO CO-PENDING APPLICATIONS

Priority is claimed from:

U.S. patent application Ser. No. 61/451,344 "A moving cellular communication system operative in an emergency mode", filed 10 Mar. 2011

Israel Patent Application No. 218046, "A multi-directional relay architecture and apparatus and methods of operation useful in conjunction therewith", filed 12 Feb. 2012.

U.S. patent application Ser. No. 61/451,166 "Cellular communication system utilizing upgraded moving relays"

U.S. patent application Ser. No. 61/451,339 "An IP based cellular communication system utilizing extended tunnels".

FIELD

The field relates to architecture and data transmission methods for use in hierarchal cellular networks.

BACKGROUND FOR THIS DISCLOSURE

Multi-layer hierarchical dynamic cellular networks pose difficulties for traffic flow and management.

A classical cellular network includes or consists of core segment and Radio Access Network (RAN). The core segment comprises at least a IP connectivity gateway and mobility management function. The Radio Access Network (RAN) comprised base stations (BS) and mobile stations (MS). Each of the mobile stations is typically connected to one of the Base Stations (FIG. 2). The RAN may also include relays.

A hierarchal cellular network (FIG. 1) may comprise a conventional cellular network, however in addition the Radio Access Network (RAN) segment enables direct connection between Base Stations/Relays so that one Base Station/Relay is capable of relaying the traffic of the other Base Stations/Relays to the core segment or to other Base Stations/Relays in a higher layer, which is connected to the core segment.

Multi-layer hierarchical dynamic cellular networks pose difficulties for routing, traffic flow and management (e.g. the multi protocol-layers handling). These difficulties may occur since the base LTE architecture, protocols and core elements do not support this type of network topology.

The disclosures of all publications and patent documents mentioned in the specification, and of the publications and patent documents cited therein directly or indirectly, are hereby incorporated by reference.

SUMMARY

Certain embodiments of the presently disclosed subject matter seek to provide a moving cellular communication system operative in an emergency mode.

In accordance with an aspect of the presently disclosed subject matter, there is provided a moving cellular communication system comprising at least one moving relay including at least one base station functionality and at least one mobile station functionality and a radio manager, all co-located, at least one emergency moving relay from among the moving relays further including a simulated stationary network that includes a simulated IP connectivity gateway operative to communicate with a simulated mobility management entity; the simulated stationary network simulates the operation of a stationary network; the emergency moving relay being a root of a sub tree that includes at least one moving relay and at least one mobile station, and is configured to utilize its mobile station functionality, base station functionality and radio manager for operating in at least the following modes of operations:
  (i) normal mode of operation wherein the emergency moving relay communicates with other relays in the network and with the stationary network;
  (ii) in response to an emergency event, operating in an emergency mode of operation, including
    a. communicating to a designated mobile station in the sub-tree each message that was received from a moving relay or a mobile station in the sub-tree and the message having an IP address of the designated mobile station; or
    b. communicating to the simulated stationary network each message that was received from a moving relay or a mobile station in the sub-tree and having an IP address that does not match any mobile station in the sub-tree.

In accordance with an embodiment of the presently disclosed subject matter, there is further provided a system, wherein the simulated stationary network further includes simulated at least one application having a respective application IP address, and wherein the operating in an emergency mode of operation, further includes communicating to a designated application in the simulated network each message that was received from a moving relay or a mobile station in the sub-tree and the message having an IP address of the designated application.

In accordance with an embodiment of the presently disclosed subject matter, there is further provided a system, wherein at least one of the moving relays being an upgraded moving relay.

In accordance with an embodiment of the presently disclosed subject matter, there is further provided a system, wherein the simulated stationary network further includes a simulated router.

In accordance with an embodiment of the presently disclosed subject matter, there is further provided a system, wherein the emergency event includes detecting disconnection of the emergency relay from the stationary network.

In accordance with an embodiment of the presently disclosed subject matter, there is further provided a system, further comprising, in response to undo emergency event, the emergency relay is configured to revert to operate in accordance with the normal mode.

In accordance with an embodiment of the presently disclosed subject matter, there is further provided a relay station that comprises a standard base station and several mobile handsets that serve as a mobile backhauling link.

Also provided is a moving cellular communication system forming part of a cellular communication network having a core element may be provided, according to certain embodiments. The system may include at least one emergency moving relay including at least one base station functionality serving at least one mobile station; at least one mobile station functionality; and a relay resource manager, all co-located. Typically, the relay resource manager includes a core functionality operative, selectably, to take over at least one core function performed by said core element, for said at least one mobile station served by said base station functionality separation of an entire group of moving relays from a larger group of moving relays may be provided, whereby each of the two separate groups has its own core element/functionality.

According to some embodiments, the relay resource manager's core functionality takes over from the original core before the impending and detected emergency period or difficult period. According to other embodiments, takeover occurs after disconnection has occurred e.g. if disconnection is impossible to predict. Disconnection typically includes any situation in which two relays or groups of relays or a static base station and relay that were part of the same network can no longer communicate between them. The relay resource manager monitors the situation, typically including all messages, and when the relay resource manager detects disconnection between the relay and its parent it typically "takes over" from the original core rapidly enough so minimal interruption to communication is felt.

The relay resource manager's core functionality, after the emergency, hands back the core function/s performed during the emergency, to the original core. The handover process is also termed herein fusion or recombination or reconnection. This occurs when the two relays or group of relays or static base station and relays that were disconnected are now in a new situation which again enables them to have a communication link between them.

As described above, each emergency relay typically includes the following elements: mobile station functionality, base station functionality, relay resource manager and core functionality which is part of the relay resource manager. In normal mode, e.g. when this emergency relay is part of (and is not disconnected from) a hierarchical multi-hop relay cellular network, the emergency relay acts as a normal relay, e.g. uses its mobile station functionality for providing at least one backhauling link, its base station functionality for providing at least one access link with served mobile station s and its relay resource manager for normal relay internal operations such as but not limited to some or all of: encapsulation, routing, QOS management, load handling, security, and radio resource management.

In an event of emergency e.g. when said emergency relay is disconnected from the hierarchical multi-hop relay cellular network, the core functionality of the relay is used to serve the emergency relay mobile station s, the mobile station functionalities that are under the relay topology tree (e.g. are descendants of the emergency relay) and the other mobile station's served by base station functionalities that are under the relay topology tree (e.g. are descendants of the emergency relay), instead of the above each being served by the previously used core element of the hierarchical multi-hop relay cellular network. In addition, in an event of emergency, the mobile station functionality is typically no longer used for the hackhauling link as this no longer exists due to the disconnections. Instead, the mobile station functionality may optionally be active in finding new networks to connect to (to "fuse" with).

Typically, mobility, policy, QoS, loads, security and billing, and other core functions change once the core becomes mobile and most or all of the core elements performing these functions may do so with adaptations, first, the core, once mobile, typically handles disconnections and reconnections more often that a static core does second, a core, in order to become mobile, typically needs to handle a mass transfer of mobile station s and base stations (e.g. relays) from one core functionality or element to an other core functionality, substantially simultaneously. In addition, for example, the billing service is typically distributed between the two separate groups of relays which has formed, each group collecting its own billing records, such that in case of fusion these records are typically combined or shared.

Typically, all core entities of the core functionality have two modes of operation, as opposed to the single mode of operation of a static core: a regular mode, when the core is used to serve all mobile station s of its relay and all other mobile station s and mobile station (MS) Functionalities in the topology tree under it; and a shadow mode, when the core is not actually used to serve all mobile stations of its relay and all other mobile station (MS)s and mobile station (MS) Functionalities in the topology tree under the core however is typically still active to allow the potentially mobile core to take over smoothly when disconnection from the static core occurs. This may be done by frequently updating the local core functionality with all the information it may need during disconnection, such as but not limited to some or all of: list of mobile station (MS)s served by the emergency relay, all other mobile station (MS)s and mobile station (MS) Functionalities in the topology tree under the emergency relay, all BASE station functionality in the topology tree under the emergency relay, all IP addresses of all these. The above information may be obtained from the active core located in the tree root.

The core functionality's take-over of the at least one core function from the core element typically includes taking over at least one mobility-management function e.g. LTE MME function/s, from the static core element. It is appreciated that take-over and hand-back of mobility-management aspects of the core element's functioning have, for clarity, been described in the general context of LTE's MME (this process may includes for example the process in LTE that is called "inter-MME handover" in which one mobile station (MS) is handed over from one MME to other MME), which is but one example of mobility management apparatus. It is appreciated that take-over and hand-back of mobility-management aspects of the core element's functioning as described herein, may, mutatis mutandis, be applied to mobility management apparatus other than LTE's MME.

The core functionality's take-over of the at least one core function from the core element typically includes taking over at least one policy-management and control function. It is appreciated that take-over and hand-back of policy-management aspects of the core element's functioning have, for clarity, been described in the general context of LTE's HSS, which is but one example of policy management apparatus. It is appreciated that take-over and hand-back of policy-management aspects of the core element's functioning as described herein, may, mutatis mutandis, be applied to policy management apparatus other than LTE's HSS.

The following abbreviations are employed herein:
SNR=Signal to Noise Ratio
SNIR=Signal to Noise and Interference Ratio
SIR Signal to Interference Ratio
BER=Bir Error Rate
BLER=BLock Error Rate
PER=Packet Error Rate
Eb/No=Energy of Bit over Noise spectral density
Ec/No=Energy of Carrier (symbol) over Noise spectral density
Ec/Io=Energy of Carrier (symbol) over Interference spectral density
RSSI=Received Signal Strength Indication (or as per LTE standard)
RSRP=as per LIE standard.
RSRQ=as per LTE standard.

Other embodiments of the present invention include:

Embodiment 1

A moving cellular communication system forming part of a cellular communication network having a core element, the system comprising:
at least one emergency moving relay including:
at least one base station functionality serving at least one mobile station;
at least one mobile station functionality providing at least one backhauling link toward the core element; and
a relay resource manager operative to manage at least one resource pertaining to at least one of the base station functionality and mobile station functionality,
all co-located,
wherein the relay resource manager includes a core functionality operative, selectably, to take over at least one core function performed by said core element, for said at least one mobile station served by said base station functionality.

Embodiment 2

The system according to Embodiment 1 wherein the core functionality takes over said functionality in real time and without disrupting ongoing communication over the network.

Embodiment 3

The system according to Embodiment 1 wherein the core functionality is also operative, selectably, to hand back said at least one functionality taken over from said core element.

Embodiment 4

The system according to Embodiment 1 wherein said core functionality comprises connecting between at least a pair of mobile stations characterized in that at least one core function pertaining to said pair which was previously performed at the core element is now performed by the core functionality of the relay resource manager.

Embodiment 5

The system according to Embodiment 1 wherein said core functionality comprises connecting between:
at least one mobile station characterized in that the core element previously performed at last one core function for the mobile station whereas the core functionality of the relay resource manager now performs said core function for the mobile station; and
at least one additional mobile station characterized in that the core element still performs said at last one core function for the additional mobile station's core.

Embodiment 6

The system according to Embodiment 1 wherein said at least one core function comprises connecting between at least one mobile station characterized in that the core element previously served as the mobile station's core whereas the core functionality of the relay resource manager now serves as the mobile station's at least one core function and a server.

Embodiment 7

The system according to Embodiment 6 wherein said server includes one of the following types of servers: internet server, internet gateway, terrestrial communication network server, terrestrial communication network gateway, video server, gaming server, voice calls server, SIP server, mapping server.

Embodiment 8

The system according to Embodiment 3 wherein the core functionality hands back said at least one core function without disrupting ongoing communication over the network.

Embodiment 9

The system according to Embodiment 1 wherein the core functionality's take-over of the at least one core function from the core element includes taking over at least one mobility-management function in the core element's functioning.

Embodiment 10

The system according to Embodiment 1 wherein the core functionality's take-over of the at least one core function from the core element includes taking over at least one policy-management and control function in the core element's functioning.

Embodiment 11

The system according to Embodiment 1 wherein the core functionality's take-over of the at least one core function from the core element includes taking over at least one QoS-management function of the core element's functioning.

Embodiment 12

The system according to Embodiment 1 wherein the core functionality's take-over of the at least one core function from the core element includes taking over at least one load-management function of the core element's functioning.

Embodiment 13

The system according to Embodiment 1 wherein the core functionality's take-over of the at least one core function from the core element includes taking over at least one billing-management function of the core element's functioning.

Embodiment 14

The system according to Embodiment 3 or 8 wherein the core functionality's hand-back of the at least one core function from the core element includes handing back at least one mobility-management function of the core element's functioning.

Embodiment 15

The system according to Embodiment 3 or 8 wherein the core functionality's hand-back of the at least one core function from the core element includes handing back at least one policy-management and control function of the core element's functioning.

Embodiment 16

The system according to Embodiment 3 or 8 wherein the core functionality's hand-back of the at least one core function from the core element includes handing back at least one QoS-management function of the core element's functioning.

Embodiment 17

The system according to Embodiment 3 or 8 wherein the core functionality's hand-back of the at least one core function from the core element includes handing back at least one load-management function of the core element's functioning.

Embodiment 18

The system according to Embodiment 3 or 8 wherein the core functionality's hand-back of the at least one core function from the core element includes handing back at least one billing-management function of the core element's functioning.

Embodiment 19

The system according to Embodiment 1 wherein the core functionality includes a simulated stationary network having a simulated IP connectivity gateway operative to communicate with a simulated mobility management entity and said simulated stationary network simulates the operation of a stationary network.

Embodiment 20

The system according to Embodiment 1 wherein said emergency moving relay is a root of a sub tree that includes at least one moving relay and at least one mobile station, and is configured for utilizing its mobile station functionality, base station functionality and radio manager for operating in at least the following modes of operations:
  i. normal mode of operation wherein the emergency moving relay communicating with other relays in the network and with the stationary network;
  ii. in response to an emergency event, operating in an emergency mode of operation, including
     a. communicating to a designated mobile station in the sub-tree each message that was received from a moving relay or a mobile station in said sub-tree and said message having an IP address of the designated mobile station; or
     b. communicating to said core functionality each message that was received from a moving relay or a mobile station in said sub-tree and having an IP address that does not match any mobile station in the sub-tree.

Embodiment 21

The system according to Embodiment 1 and also comprising at least one moving relay other than said emergency moving relay.

Embodiment 22

The system according to Embodiment 20, wherein said core functionality further including simulated at least one application having respective application IP address, and wherein said operating in an emergency mode of operation, further including
  communicating to a designated application in said core functionality each message that was received from a moving relay or a mobile station in said sub-tree and said message having an IP address of the designated application.

Embodiment 23

The system according to Embodiment 20, wherein said emergency event includes a detected disconnection of the emergency relay from other relay.

Embodiment 24

The system according to Embodiment 1, wherein said core functionality further includes a simulated router.

Embodiment 25

The system according to Embodiment 20, wherein said emergency event includes a detected disconnection of the emergency relay from the stationary network.

Embodiment 26

The system according to Embodiment 20, wherein said emergency relay is configured to revert to operate in accordance with said normal mode, upon termination of an emergency event.

Embodiment 27

The system according to Embodiment 1 wherein said at least one emergency moving relay comprises a plurality of at least one emergency moving relays to accommodate for a situation of separation of a subset of moving relays from a larger group of moving relays necessitating each of the two separate groups is having its core element/functionality.

Embodiment 28

An emergency communication method for a moving cellular communication system forming part of a cellular communication network having a core element, the method comprising:
  providing at least one emergency moving relay including: at least one base station functionality serving at least one mobile station; at least one mobile station functionality providing at least one backhauling link toward the core element; and a relay resource manager operative to manage at least one resource pertaining to at least one of the base station functionality and mobile station functionality, all co-located; and
  providing the relay resource manager with a core functionality operative, selectably, to take over at least one core function performed by said core element, for said at least one mobile station served by said base station functionality.

Embodiment 29

The method according to Embodiment 28 wherein the core element serves a core of a static cellular communication network.

Embodiment 30

The method according to Embodiment 28 wherein the core element serves a core of a moving cellular communication network.

Embodiment 31

The system according to Embodiment 1 wherein said mobile station comprises a mobile station functionality of another relay.

Embodiment 32

The system according to embodiment 1 wherein the core functionality takes over said functionality while backhauling link is active.

Embodiment 33

The system according to embodiment 1 wherein the core functionality takes over said functionality while said at least one mobile station functionality is connected to one of: another relay base station functionality; and a static base station.

Embodiment 34

The system according to Embodiment 32 wherein said taking over is activated [as a result of/in response to/due to] measurements collected by one of said at least one mobile station functionality or said at least one base station functionality.

Embodiment 35

The system according to Embodiment 34 wherein said measurements includes link quality parameters.

Embodiment 36

The system according to Embodiment 34 wherein said measurements includes one of: SNR, SNIR, SIR, BER, BLER, PER, Eb/No, Ec/No, Ec/Io, RSSI, RSRP, RSRQ.

Embodiment 37

The system according to any of embodiments 1-3 or 31, wherein the core functionality takes over said functionality while backhauling link is not active.

Embodiment 38

The system according to Embodiment 8 wherein said handing back is done in response to mobile station functionality connected to one of: other relay base station functionality or static base station.

Embodiment 39

The system according to Embodiment 9 wherein the at least one mobility-management function comprises at least one LTE MME function.

Embodiment 40

The system according to Embodiment 1 wherein the core functionality's take-over of the at least one core function from the core element includes taking over at least one gateway function of the core element's functioning.

Embodiment 41

The system according to Embodiment 40 wherein said gateway function comprises at least one of an LTE PDN-GW function and a Serving-GW function.

Embodiment 42

The system according to any of embodiments 1-3 or 31 where said at least one mobile station functionality is not connected to another relay base station functionality and is not connected to a static base station.

The subject matter of the invention further contemplates a counterpart method and corresponding embodiments, mutatis mutandis.

The following terms may be construed either in accordance with any definition thereof appearing in the prior art literature or in accordance with the specification, or as follows:

access link: a bi-directional link between a relay node (RN) base station functionality and a mobile station (MS) served thereby or between a base station and a mobile station served thereby. It typically has an uplink portion and a downlink portion, both uni-directional.

Backhaul data: data being transferred, typically bi-directionally, over at least one backhauling link.

Backhauling link: bi-directional link other than an access link e.g. link between relays in adjacent levels or link between relay and static base station or link between relays and relay proxy or link between base station functionality or static base station or relay proxy and core. More generally, a backhauling link hi-directionally links distributed sites to each other or links access points e.g. base stations and a more centralized point e.g. a core. Typically a backhauling link has an uplink portion and a downlink portion, both uni-directional.

base station: one of a plurality of stationary or mobile nodes in a cellular communication network which are sufficiently densely distributed over a served area such that almost all mobile communication devices served by the network can almost always communicate with one another or with a terrestrial network through those nodes, typically including allowing users of such devices to converse and/or exchange digital information between them or with a terrestrial network, via communication paths defined between respective pairs of base stations and mobile communication devices.

base station functionality: functionality, typically software implemented, residing on a relay which communicates with an antenna, transmitter and receiver to enable the relay to function as a base station, e.g. to converse and/or exchange digital information between them or with a terrestrial network, via communication paths defined between respective pairs of base stations and mobile communication devices.

bi-directional link: a link between levels of a hierarchical communication network which includes both an uplink and a downlink.

cell: base station.

core: server in a cellular communication system that performs some or all of the following functions: (1) connects between mobile station (MS)s that are attached to the same core; and/or (2) connects between mobile station (MS)s that are attached to one core with mobile station (MS)s that are attached to a different core; and/or (3) connects mobile station (MS)s attached to the core to other servers such as an Internet server, terrestrial communication network servers, video servers, gaming servers (not shown), (4) managing mobility of the mobile stations, (5) managing quality of service for the mobile stations, (6) managing and controlling policies and billing of the mobile stations, (7) managing security aspects of the network (e.g. authentication, integrity, encryption).

Core Network: synonym for "core" or core plus network linked thereto, or core elements performing some or all of the core functions as described herein plus the network that interconnects all core elements/functions.

Ctrl or Control: e.g. as per LTE protocol.

donor: serving relationship e.g. a base station serving e.g. a relay node.

Downlink (DL): a uni-directional portion of a link e.g. backhauling or access link from a relay's base station functionality or static base station to a mobile station functionality or mobile station.

DL UE or Downlink (DL) UE: downlink to a user entity via a sequence of at least one relay down-stream (DS): flow of data from a higher point at the topology (closer to the core) to a lower point at the topology (further from the core).

eNB: base station, or base station functionality e.g. in a relay, which uses LTE protocol. Also termed herein "LTE base station".

GTP: a group of IP-based communications protocols used to carry General Packet Radio Service (GPRS) within GSM, UMTS and LTE networks.

GTP bearer: A bearer using a GTP protocol.

GTP tunnel: A tunnel using a GTP protocol.

Link: Telecommunications or radio link between nodes of a communication network. It is appreciated that a portion, typically uni-directional, of a typically bi-directional link is also sometimes termed a link. There may be one or more channels in a link, e.g. in LTE all the following channels are uplinks: PUCCH, PUSCH, PRACH.

Mobile station or mobile communication device: a portable electronic device which communicates with other such devices or with a terrestrial network via a cellular communication network, typically including allowing users of such devices to converse and/or exchange digital information between them. The device may even comprise a dongle connected to a computer or sensor with no user nearby.

Mobile station functionality: functionality, typically software implemented, residing on a relay which communicates with an antenna, transmitter and receiver to enable the relay to function as a mobile communication device. The mobile station functionality typically includes antenna, RF front-end, Modem (communications processor) but does not necessarily include an application processor nor appliances such as keyboard, screen, microphone, and speaker which serve a conventional mobile station.

Radio bearer, bearer: e.g. as per 3GPP terminology.

RE resource block: e.g. as per LTE standard or an adaptation thereof suitable for operation within communication standards other than LTE.

relay: a node in the cellular communication network equipped with an antenna, transmitter and receiver and functioning both as a mobile communication device and a base station and extending the coverage of the base-stations.

Relay link: link or radio segment between a relay node and a donor base station.

Segment: link.

Subframe: e.g. as per LTE protocol

Trans. Downlink (DL) backhauling: transmit backhauling using downlink.

Tunnel: as per protocols that enables tunneling such as but not limited to GRE and GPRS.

UE: user entity or mobile station or mobile communication device or mobile station functionality. e.g. in a relay, which uses LTE protocol. Also termed herein "LTE mobile station".

Uplink (UL): a uni-directional portion of a pair of links e.g. of backhauling or access links, from a relay's mobile station functionality or mobile device to a relay's base station functionality or static base station.

Uplink backhaul data: data being transferred uni-directionally, over only the uplink portion of at least one backhauling link, typically from a base station to a core or more generally from an access point to a more centralized point.

upstream (US): flow of data from a lower point in a network topology (i.e. further from the core) to a higher point in a network topology (i.e. closer to the core).

Abbreviations:

TeNb or rBS: base station functionality in relay

SeNB or BS: stationary base station

MS/BS: mobile/base station

MME: mobility management entity rRM: relay resource manager

SM: Served Mobile i.e. Mobile station

RN: relay node s/p gw: p-gateway or s-gateway or p-gateway+s-gateway.

tUE, rMS, rue (relay user equipment): mobile station functionality in relay

Also provided is a computer program comprising computer program code means for performing any of the methods shown and described herein when said program is run on a computer; and a computer program product, comprising a typically non-transitory computer-usable or -readable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
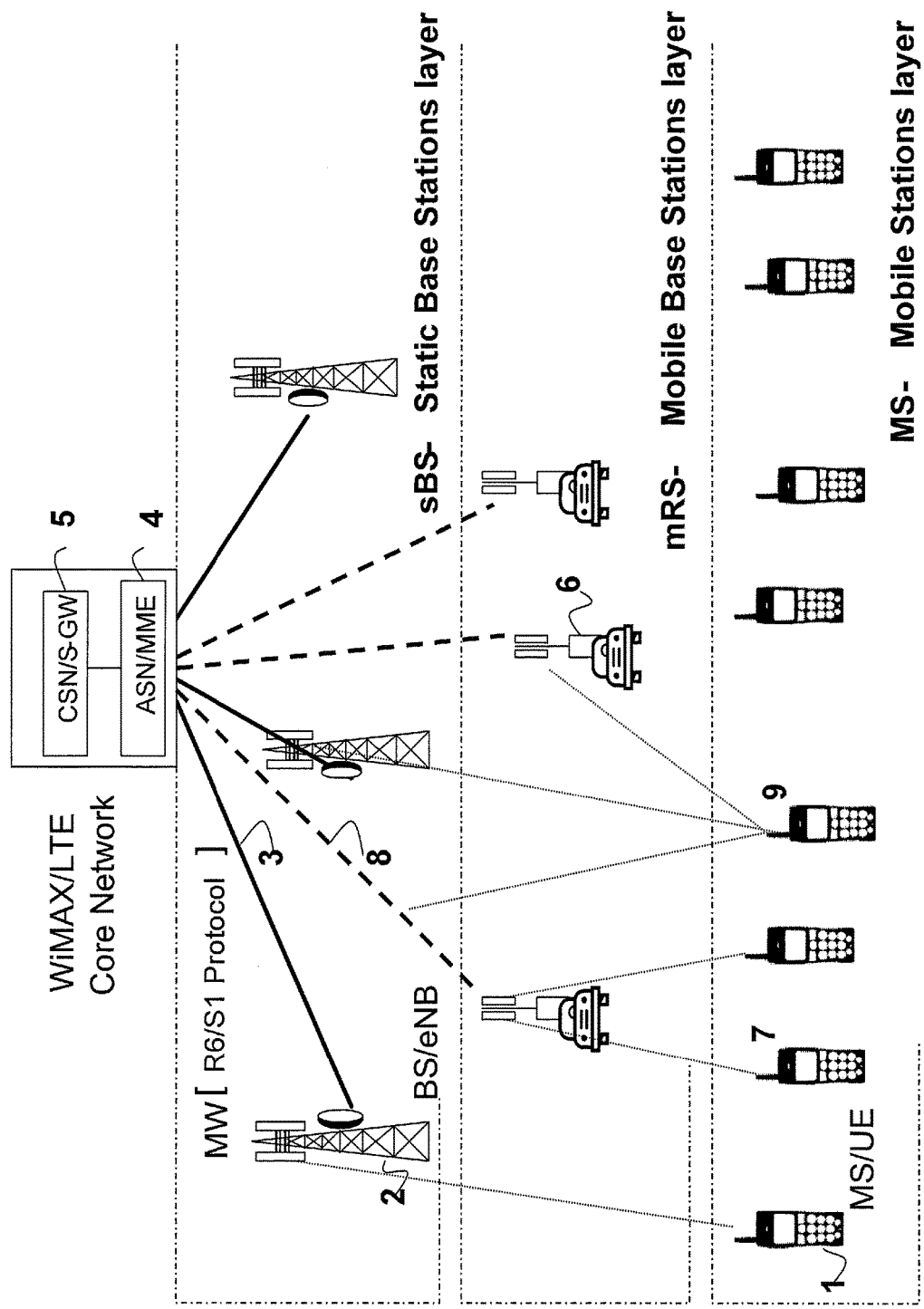
FIG. 1 illustrates a multi-layer cellular network comprising core network regular radio access network and relayed radio access network.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act, behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include an apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION

Operation of a cellular communication system that utilizes moving relays as well as a hierarchical cellular network is described in PCT Application No. PCT/IL2011/000096 entitled "Cellular communication system with moving base stations and methods and apparatus useful in conjunction therewith" filed on Jan. 27, 2011 published as Published PCT Application No. WO/2011/092698. The following embodiments inter alia are known in the art by virtue of being described in the above publication:

Embodiment 1

A moving cellular communication system comprising:
a plurality of moving relays each including base station functionality, a radio manager and mobile station functionality, all co-located,
wherein each base station functionality is operative to communicate via antennae with at least one mobile station thereby to define a first radio link there between, and wherein each base station functionality has a physical connection to its co-located radio manager,
wherein each mobile station functionality communicates via antennae with a unit which has base station functionality thereby to define a second radio link,
wherein the radio manager in each individual moving relay comprises:
a radio resource manager; and
functionality for exchanging information with radio managers included in moving relays other than said individual moving relay,
wherein said information is used by said radio resource manager to select, for at least one individual mobile station seeking to be served, one of:
a static base station; and
a base station functionality,
to which to connect said individual mobile station in order to provide cellular communication services thereto.

Embodiment 2

A system according to embodiment 1 operative in conjunction with a cellular network including a core device, at least one static base station, and a population of mobile stations communicating via antennae with at least one of the base stations, wherein at least one topological change in said system occurs dynamically, said topological change comprises a dynamic change in at least one connection between a moving relay and at least one of a moving relay and a static base station.

Embodiment 3

A system according to embodiment 2 wherein at least one radio resource manager locally stores at least some of the information it uses to make a decision regarding selection of a cellular communication service provider for an individual mobile station seeking to be served, even after said decision has been made, thereby to generate a database co-located with said radio resource manager.

Embodiment 4

A system according to embodiment 1 wherein said information used by said radio resource manager includes information obtained from its co-located base station functionality.

Embodiment 5

A system according to embodiment 1 or embodiment 4 wherein said information used by said radio resource manager includes information obtained from its co-located mobile station functionality.

Embodiment 6

A system according to embodiment 5 wherein said information obtained from said co-located mobile station functionality is derived from at least one measurement of at least one characteristic of said second radio link.

Embodiment 7

A system according to embodiment 6 wherein said functionalities are provided in accordance with a cellular communication standard and wherein said information includes information provided by said mobile station functionality in accordance with said standard.

Embodiment 8

A system according to embodiment 7 wherein said cellular communication standard comprises 3GPP E-UTRAN LTE.

Embodiment 9

A system according to embodiment 8, where the information includes at least one of RSSI, RSRP, RSRQ.

Embodiment 10

A system according to embodiment 1 wherein each said moving relay and each said mobile station constitutes a cellular communication node and wherein said links generate routes interconnecting said nodes and wherein at least one radio resource manager residing at an individual node is operative to compute a route quality parameter characterizing quality of at least one individual route passing through said individual node, by combining information pertaining to links along said individual route.

Embodiment 11

A system according to embodiment 10 wherein said radio resource manager operative to compute a route quality parameter combines information pertaining to links along said individual route by computing a minimum from among values characterizing respective qualities of all links forming said individual route.

Embodiment 12

A system according to embodiment 10 wherein said system is operative in conjunction with a cellular network including a core device, at least one static base station, and a population of mobile stations communicating via antennae with at least one of the base stations, and wherein said individual route comprises a route connecting said individual node to at least one of the static base stations.

Embodiment 13

A system according to embodiment 1 wherein said system is operative in conjunction with a static network including a core device, at least one static base station, and a population of mobile stations communicating via antennae with at least one of the base stations and wherein each individual radio manager that does not have a sufficiently high quality connection to the static network can provide communication, via said individual radio manager's co-located base station functionality, between mobile stations that are connected to said co-located base station functionality.

Embodiment 14

A system according to embodiment 13 wherein said system is operative in conjunction with a static network including a core device, at least one static base station, and a population of mobile stations communicating via antennae with at least one of the base stations and wherein each radio manager that does not have a connection to the static network can provide communication, via said individual radio manager's co-located base station functionality, between mobile stations that are connected to said co-located base station functionality.

Embodiment 15

A system according to embodiment 1 wherein at least one individual radio manager can provide communication, via at least one base station functionality linked to said radio manager, between mobile stations that are connected to said at least one base station functionality.

Embodiment 16

A system according to embodiment 1 wherein each resource manager is operative to selectably establish communication between at least one mobile station connected to its co-located base station functionality and at least one mobile station connected to a moving relay to which said resource manager's co-located mobile station functionality is linked via a route.

Embodiment 17

A system according to embodiment 16 wherein said route includes a plurality of links.

Embodiment 18

A system according to embodiment 10 wherein said radio resource manager residing at said individual node computes a plurality of route quality parameters for a corresponding plurality of route alternatives.

Embodiment 19

A system according to embodiment 18 wherein said radio resource manager provides said plurality of route quality parameters to an individual mobile station connected to the base station functionality co-located with said radio resource manager.

Embodiment 20

A system according to embodiment 19 wherein said individual mobile station is operative, when in a mode in which it is its own decision to which unit having base station functionality it is to be connected, to make said decision based at least in part on said plurality of route quality parameters.

Embodiment 21

A system according to embodiment 6 wherein said information obtained from said co-located mobile station functionality includes said at least one measurement itself.

Embodiment 22

A system according to embodiment 4 wherein said information obtained from said co-located base station functionality is derived from at least one measurement of at least one characteristic of said first radio link.

Embodiment 23

A system according to embodiment 22 wherein said information obtained from said co-located base station functionality includes said at least one measurement itself.

Embodiment 24

A system according to embodiment 8 or embodiment 9 where the information includes a rsSINR (reference signal SINR) metric.

Embodiment 25

A system according to embodiment 1 in which an individual mobile station is connected to an individual base station functionality and wherein a decision to transfer said individual mobile station away from said individual base station functionality is made by a resource manager co-located with said individual base station functionality.

Embodiment 26

A system according to embodiment 1 and also comprising a cellular network including a core device, at least one static base station, and a population of mobile stations communicating via antennae with at least one of the base stations.

Embodiment 27

A system according to embodiment 26 and also comprising a relay network manager (DisNetRM) located at a static network core device.

Embodiment 28

A system according to embodiment 1 wherein, for at least one mobile station functionality in at least one individual moving relay, said unit which has base station functionality comprises a base station functionality of a moving relay other than said individual moving relay.

Embodiment 29

A system according to embodiment 1 operative in conjunction with a cellular network including a core device, at least one static base station, and a population of mobile stations communicating via antennae with at least one of the base stations,
wherein, for at least one mobile station functionality in at least one individual moving relay, said unit which has base station functionality comprises said static base station.

Embodiment 30

A system according to embodiment 1 wherein said information, but for said exchanging, is accessible to only a subset of said radio managers.

Embodiment 31

A system according to embodiment 1 wherein said information comprises link information characterizing at least one of said radio links.

Embodiment 32

A system according to embodiment 28 wherein for the mobile station functionality co-located with said moving relay other than said individual moving relay, said unit which has base station functionality also comprises a base station functionality of a moving relay rather than a static base station, thereby to provide multi-hop capability to said system.

Embodiment 33

A system according to embodiment 27 in which an individual mobile station is connected to an individual base station functionality and wherein a decision to transfer said individual mobile station away from said individual base station functionality is made centrally by said relay network manager (DisNetRM).

Embodiment 34

A system according to embodiment 20 and also comprising a cellular network including a core device, at least one static base station, and a population of mobile stations communicating via antennae with at least one of the base stations wherein said individual mobile station decides to establish connection with the unit having base station functionality which, according to said plurality of route quality parameters, provides said individual mobile station with the best route to one of the static base stations.

Embodiment 35

A mobile communication network system operative in conjunction with a core network including a core device and at least one static base station, the system comprising:
 a plurality of base stations; and
 a population of mobile stations communicating via antennae with the base stations;
 the base stations including at least one moving base station which communicates via antennae with the mobile stations and includes base station functionality, a first radio manager and mobile station functionality all co-located with the base station functionality,
 the base station functionality having a physical back-connection to the first radio manager, the first radio manager having a physical connection with the mobile station functionality, the mobile station functionality communicating via antennae with at least one selectable static base station,
 wherein the first radio manager comprises:
 a radio resource manager; and
 functionality for receiving information from, and sending information to, other radio managers, respectively co-located with other moving base stations, and for using the information to determine whether to reject at least one mobile station seeking to be served by an individual base station associated with the individual co-located radio manager,
 wherein the information used to determine whether to reject includes at least one of the following:
 location of said at least one moving base station; and
 statistics re measurements of link quality.

Embodiment 36

A system according to embodiment 35 wherein said information comprises information regarding qualities of respective connections of respectively co-located radio managers back to the core network is provided by respectively co-located radio managers via a selected one of:
a static base station from among the at least one static base station of the core network; and
a moving base station capable of providing service to the individual radio manager's co-located mobile device.

Embodiment 37

A system according to embodiment 35 wherein said information regarding quality of its own connection back to the core network is provided by its own co-located mobile station.

Embodiment 38

A system according to embodiment 35 wherein said information includes information regarding channel quality which other base stations are able to provide mobile stations in the vicinity of the individual co-located radio manager and which is provided by reports generated by said mobile stations in said vicinity.

Embodiment 39

A system according to embodiment 35 wherein said information regarding quality of service available from its own base station for mobile stations in the vicinity of the individual co-located radio manager is provided by its own co-located mobile station.

Embodiment 40

A system according to embodiment 35 wherein said other radio manager is operative to compute, for at least one individual mobile station, route comparison information including a plurality of routes of base stations via which the individual mobile station can communicate with the core network and at least one parameter characterizing the relative quality of each of said routes and to communicate to said individual mobile station information indicative of said route comparison information and wherein said individual mobile station is operative to select a base station to be connected to, at least partly based on said information indicative of said route comparison information.

Embodiment 41

A system according to embodiment 40 wherein said parameter is based upon a minimum SNR (signal noise ratio) value, over sections which together compose a route, each section having its own SNR (signal noise ratio) value.

Embodiment 42

A system according to embodiment 40 wherein said parameter characterizing route quality is a combination of measured qualities of route sections and fluctuations thereof such that route sections with largely fluctuating quality measurements are devalued due to their unpredictability.

Embodiment 43

A system according to embodiment 35 wherein at least one individual co-located radio manager includes a mobile-to-mobile direct communication facilitation functionality operative to provide direct communication, not requiring said core network, between a plurality of mobile devices in said individual radio manager's vicinity.

Embodiment 44

A system according to embodiment 35 wherein said moving base station observes a silence period during which it refrains from transmitting to its own co-located mobile station.

Embodiment 45

A system according to embodiment 44 wherein at least one characteristic of said silence period is dynamically determined by the moving base station's co-located radio manager.

Embodiment 46

A system according to embodiment 45 wherein said characteristic comprises a zone in which silence is observed which is defined over at least one of a frequency band and a time window.

Embodiment 47

A system according to embodiment 35 wherein said network comprises a tactical E-UTRAN network.

Embodiment 48

A system according to embodiment 35 wherein if a multi-hop communication route is used, in which a relay R that is connected to the core network via another relay A, relay R sends a message to a backhauling relay that R is A's anchor.

Embodiment 49

A system according to embodiment 35 wherein said static base station is co-located with said core device.

Embodiment 50

A system according to embodiment 35 wherein said physical back-connection comprises an Ethernet back-connection.

Embodiment 51

A system according to embodiment 35 wherein said radio resource manager comprises an E-UTRAN radio resource manager.

Embodiment 52

A mobile communication networking method comprising:
providing a core network including a core device and at least one static base station; a plurality of base stations; and a population of mobile stations communicating via antennae with the base stations;
the base stations including at least one moving base station which communicates via antennae with the mobile stations and includes base station functionality, a first radio manager and mobile station functionality all co-located with said base station functionality, the base station functionality having a physical back-connection to the first radio manager, the first radio manager having a physical connection with said mobile station functionality, the mobile station functionality communicating via antennae with at least one selectable static base station, wherein said first radio manager comprises a radio resource manager; and functionality for receiving information from, and sending information to, other radio managers, respectively co-located with other moving base stations; and using said information to determine whether to reject at least one mobile station seeking to be served by an individual base station associated with said first radio manager.

Embodiment 53

A system according to embodiment 35 wherein users are shown a good location for Quality Grade Result (QGR).

Embodiment 54

A system according to embodiment 53 wherein statistical measurements of a co-located mobile station (MS) in each at least one relay are attached to location results of the relay and wherein said system includes at least one relay radio manager (rRM) having a functionality that computes and indicates to the user locations with good QGC (quality grade control).

Embodiment 55

A system according to embodiment 48 wherein the backhauling relay becomes aware that another relay is connected to it and finds a good place to remain.

Embodiment 56

A system according to embodiment 35 wherein said information includes information regarding qualities of other base stations' respective connections back to the core network.

Embodiment 57

A system according to embodiment 35 wherein said information includes information regarding quality of the first radio manager's moving base station's connection back to the core network.

Embodiment 58

A system according to embodiment 35 wherein said information includes information regarding channel qualities which said first radio manager's own base station, and base stations other than said first radio manager's own base station, are respectively able to provide, to mobile stations in the vicinity of the first radio manager.

Embodiment 59

A method according to embodiment 52 wherein said information includes information regarding qualities of other base stations' respective connections back to the core network.

Embodiment 60

A method according to embodiment 52 wherein said information includes information regarding quality of the first radio manager's moving base station's connection back to the core network.

Embodiment 61

A method according to embodiment 52 wherein said information includes information regarding channel qualities which said first radio manager's own base station, and base stations other than said first radio manager's own base station, are respectively able to provide, to mobile stations in the vicinity of the first radio manager.

Embodiment 62

Combinations of embodiments with other embodiments.

Embodiment 63

A mobile communication network system operative in conjunction with a network including a core device, a plurality of base stations including at least one static base station, and a population of mobile stations communicating via antennae with at least one of the base stations, the system comprising:

at least one moving base station included in said plurality of base stations which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable base station, wherein the first radio manager comprises:
a radio resource manager; and
functionality for receiving information from, and for sending information to, other radio managers, respectively co-located with other moving base stations, and for using the information to determine whether to reject at least one mobile station seeking to be served by an individual base station associated with the individual co-located radio manager.

Embodiment 64

A mobile communication network system operative in conjunction with a network including a core device, a plurality of base stations including at least one static base station, and a population of mobile stations communicating via antennae with at least one of the base stations, the system comprising:

at least one moving base station included in said plurality of base stations which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable base station, wherein the first radio manager comprises:
a radio resource manager; and
functionality for receiving information from, and sending information to, other radio managers, respectively co-located with other moving base stations,
wherein at least one radio manager is operative to compute, for at least one individual moving base station, route comparison information including a plurality of routes of base stations via which the individual moving base station can communicate with the core network and at least one parameter characterizing the relative quality of each of said routes and wherein said individual moving base station connects to a serving base station selected at least partly based on information indicative of said route comparison information,
and wherein the plurality of routes of base stations via which the individual moving base station can communicate with the core network includes at least one route characterized by multi-hop backhauling.

Embodiment 65

A system according to embodiment 63 wherein said mobile station seeking to be served by said individual base station includes a mobile station currently being served by said individual base station.

Embodiment 66

A system according to embodiment 63 wherein said individual base station is co-located with the individual co-located radio manager.

Embodiment 67

A system according to embodiment 63 wherein said individual base station is served by the individual co-located radio manager.

Embodiment 68

A system according to embodiment 63 wherein said functionality is also operative to determine a base station other than said individual base station, which is more suitable than said individual base station to serve said mobile station seeking to be served.

Embodiment 69

A system according to embodiment 63 wherein at least one radio manager is operative to compute, for at least one individual moving base station, route comparison information including a plurality of routes of base stations via which the individual moving base station can communicate with the core network and at least one parameter characterizing the relative quality of each of said routes and wherein said individual moving base station connects to a serving base station selected at least partly based on information indicative of said route comparison information.

Embodiment 70

A system according to embodiment 64 wherein each said other radio manager is operative to compute, for at least one individual mobile station, route comparison information including a plurality of routes of base stations via which the individual mobile station can communicate with the core network and at least one parameter characterizing the relative quality of each of said routes and to communicate to said individual mobile station information indicative of said route comparison information and wherein said individual mobile station is operative to select a base station to be connected to, at least partly based on said information indicative of said route comparison information.

Embodiment 71

A system according to embodiment 64 wherein the radio manager computes said route comparison information for an individual moving base station served thereby whose mobile station functionality is communicating in idle mode, via antenna, with at least one selectable base station.

Embodiment 72

A system according to embodiment 64 wherein the radio manager computes said route comparison information for a moving base station co-located therewith whose mobile station functionality is communicating in active mode, via antenna, with at least one selectable base station.

Embodiment 73

A system according to embodiment 71 and wherein the individual moving base station camps on said serving base station selected at least partly based on said information indicative of said route comparison information.

Embodiment 74

A system according to embodiment 72 and wherein the individual moving base station is handed over to said serving base station selected at least partly based on said information indicative of said route comparison information.

Embodiment 75

A system according to embodiment 63 and also comprising a core device and wherein the core device allocates constant communication session bandwidth between each mobile station functionality and the base station with which it is communicating so as to maintain a constant active mode of communication between each mobile station functionality and the base station.

Embodiment 76

A system according to embodiment 64 and also comprising a core device and wherein the core device allocates constant communication session bandwidth between each mobile station functionality and the base station with which it is communicating so as to maintain a constant active mode of communication between each mobile station functionality and the base station.

Embodiment 77

A mobile communication network system serving a population of mobile stations communicating via antennae with base stations, the system including:
a plurality of base stations including at least one static base station and at least one moving base station which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable base station; and a core device which allocates constant communication session traffic between each mobile station functionality and the base station with which it is communicating so as to maintain a constant active mode of communication between each mobile station functionality and the base station.

Embodiment 78

A system according to embodiment 56 wherein said other base stations include all base stations along a route connecting said moving base station and said core, via which route said core serves said moving base station.

Embodiment 79

A system according to embodiment 77 wherein said other base stations include all base stations along a route connecting said moving base station and said core, via which route said core serves said moving base station.

Embodiment 80

A system according to embodiment 64 wherein said information includes information regarding channel qualities which said first radio manager's own base station, and base stations other than said first radio manager's own base station, are respectively able to provide, to mobile stations in the vicinity of the first radio manager.

Embodiment 81

A system according to embodiment 63 wherein said functionality is operative for detecting the quality of each end-user section and the quality of each backhauling section according to mobile stations' and mobile station functionalities' measurements and for combining said qualities into quality grade results for a current route and for alternative routes for at least one mobile station.

Embodiment 82

A system according to embodiment 81 and wherein said quality grade results are broadcast to at least one mobile station.

Embodiment 83

A system according to embodiment 81 wherein at least one handover decision, to hand over a node from one base station to another, is made by taking into account, for at least one alternative route, the quality grade result of access and backhauling sections.

Embodiment 84

A system according to embodiment 81 wherein at least one cell admission decision is made by taking into account, for at least one alternative route, the quality grade result of access and backhauling sections.

Embodiment 85

A system according to embodiment 81 wherein at least one cell reselection decision is made by taking into account, for at least one alternative route, the quality grade result of access and backhauling sections.

Embodiment 86

A system according to embodiment 81 wherein said mobile stations' and mobile station functionalities' measurements include RSRP.

Embodiment 87

A system according to embodiment 81 wherein said mobile stations' and mobile station functionalities' measurements include RSRI.

Embodiment 88

A system according to embodiment 81 wherein said mobile stations' and mobile station functionalities' measurements include RSRQ.

Embodiment 89

A system according to embodiment 63 wherein each radio manager uses measurements from at least one other radio manager over a sub-network, and at least one of RSRP, RSRI and RSRQ measurements from at least one of its co-located mobile station functionality and a mobile station, to build a radio resource measurements table.

Embodiment 90

A system according to embodiment 89 wherein at least one of said measurements is distributed by broadcast message type to all radio managers.

Embodiment 91

A system according to embodiment 81 wherein the Quality Grade Result (QGR) of all alternative routes is distributed to mobile stations using a broadcast message.

Embodiment 92

A system according to embodiment 91 wherein the broadcast message relating to each individual base station is sent to all mobile stations camping on said individual base station.

Embodiment 93

A system according to embodiment 64 wherein said information includes information regarding qualities of other base stations' respective connections back to the core network.

Embodiment 94

A system according to embodiment 63 wherein said information is transmitted between "colleague" radio managers via radio.

Embodiment 95

A system according to embodiment 63 wherein at least one radio manager "masquerades" as a base station by sending a request to a mobile station functionality to execute an NMR (Network Measurement Report) measurement.

Embodiment 96

A system according to embodiment 63 wherein said information includes information regarding quality which the first radio manager's mobile station functionality would be served by each base station capable of serving the first radio manager's mobile station functionality.

Embodiment 97

Combinations of a subset of features of certain embodiments with a subset of features of other embodiments.

Embodiment 98

A system according to embodiment 1 and wherein said radio manager includes an in-band multi-hop backhauling functionality.

Embodiment 99

A system according to embodiment 98 wherein said in-hand multi-hop backhauling functionality is operative to enhance immunity due to interference by creating new alternative routes to replace routes that are dropped due to interference, wherein each new alternative route includes a section between the end-user mobile station and mobile relay it is connected to, and a backhauling section, including the links between the mobile relays that take part as nodes in the route.

Embodiment 100

A system according to embodiment 1 wherein backhauling connectivity is provided by utilizing multi-hop routes between said moving relays.

Embodiment 101

A system according to embodiment 1 wherein backhauling of said moving relays comprises in-band multi-hop backhauling.

Embodiment 102

A system according to embodiment 1 wherein for at least one mobile station functionality in at least one individual moving relay, said unit which has base station functionality comprises an LTE base station functionality.

Embodiment 103

A system according to embodiment 1 wherein for at least one mobile station functionality in at least one individual moving relay, said unit which has base station functionality comprises a 2G base station functionality.

Embodiment 104

A system according to embodiment 1 wherein for at least one mobile station functionality in at least one individual moving relay, said unit which has base station functionality comprises a 3G base station functionality.

A relay node for use in the context of the present application, including a base station functionality, mobile station functionality and resource relay manager, may be constructed as per the teachings of the above-referenced PCT publication other than as shown and described herein.

Certain embodiments of the present invention can be utilized inter alia in scenarios incorporating a mobile relay which may be built based on base station functionality (TeNB), mobile station functionality (TUE or tUE) and relay radio/resource manager (rRM) functionality as described in PCT Application No. PCT/IL2011/000096 entitled "Cellular communication system with moving base stations and methods and apparatus useful in conjunction therewith" filed on Jan. 27, 2011 and published as WO/2011/092698 on 4 Aug. 2011.

A Moving Cellular Communication System Operative in an Emergency Mode is now described, with reference to FIGS. 2a-7.

Architecture and methods operative to transfer control and traffic information between each of many mobile stations, through any hierarchical cellular topology to any destination, be it a mobile station in the same network or any destination outside the network, are now described. A solution for the 4G 3GPP cellular network, also known as LTE (Long Term Evolution), is presented by way of example, but other applications of the invention include hierarchical cellular networks which are not LTE.

For example, the architecture and methods described herein may be applied to 3GPP 3G networks (UMTS, WCDMA, HSPA), 2G (GSM, CDMA), WiMAX or WiFi standards. For example, in 3G the core elements may comprise RNC which is partly parallel in its function to LTE MME, and/or GGSN/SGSN which is partly parallel in its function to LTE P/S-GW. IP-connectivity GW may comprise an LTE P-Gateway, S-Gateway, P/S-Gateway, or Access-Gateway; a GGSN or SGSN in 3G, an ASN-Gateway or CSN in WiMAX. The mobility management entity may comprise an LTE MME, a 3G RNC, or a WiMAX ASN.

In existing LTE cellular networks each mobile station is identified by its own IP. Typically, a packet that is addressed to a mobile station is routed through an IP connectivity gateway termed in LTE PS-GW using e.g. a GTP tunnel to the base station. From there, the packet may be sent over the air-interface (wirelessly) to the mobile station.

In a hierarchical cellular network, as known in the art e.g. as described herein and in the references cited herein, and in [3GPP TS 36.806] the packet is typically routed through several tunnels and on to the destination mobile station.

A mobile moving relay is operative for providing IP-based connectivity and optionally services in case of an emergency event, and also handing responsibility for such services back to the original performer of these IP-based connectivity and optionally services e.g. a stationary cellular core. An example of an emergency event might be a disconnection from the core network.

Figure 2A:
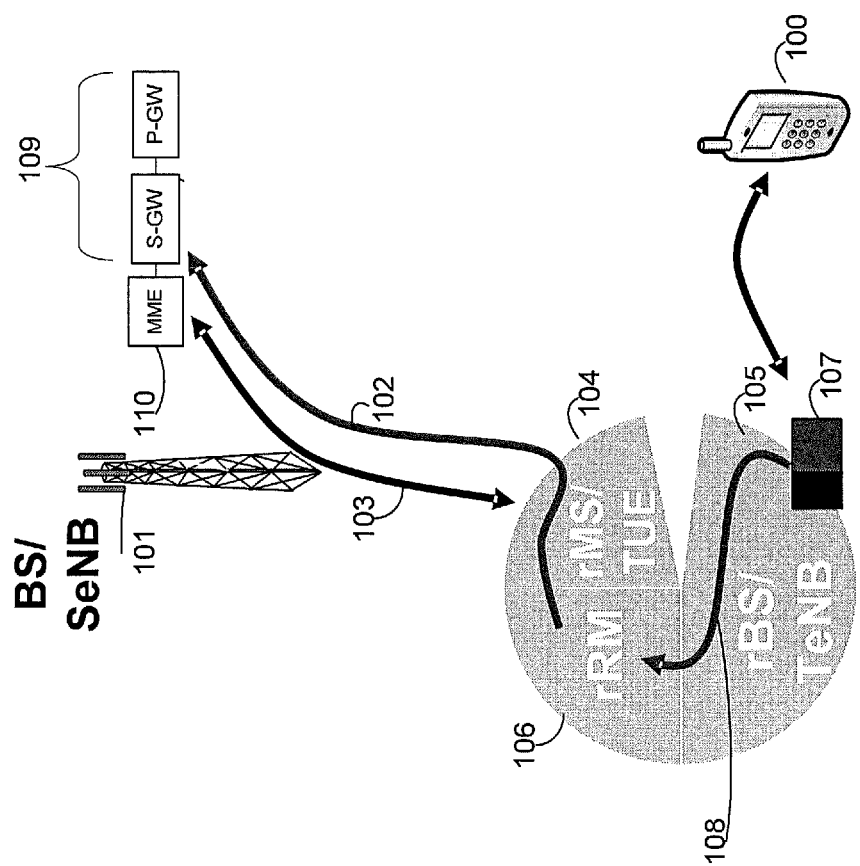
FIG. 2a is an example of an uplink message going to the stationary core and stationary base station functionality in case of a normal mode.

FIG. 2a is an example of an uplink communication message [107] (e.g. IP packet), sent by a mobile station [100] and received by the relay's base station functionality [105], which travels to a stationary core IP connectivity gateway/s [109] and through stationary base station (BS/SeNB) [101] when operating in normal operational mode. The message [107] is sent over a tunnel [102] from the relay resource manager (rRM) [106] to the IP-connectivity gateway/s [109].

Figure 2B:
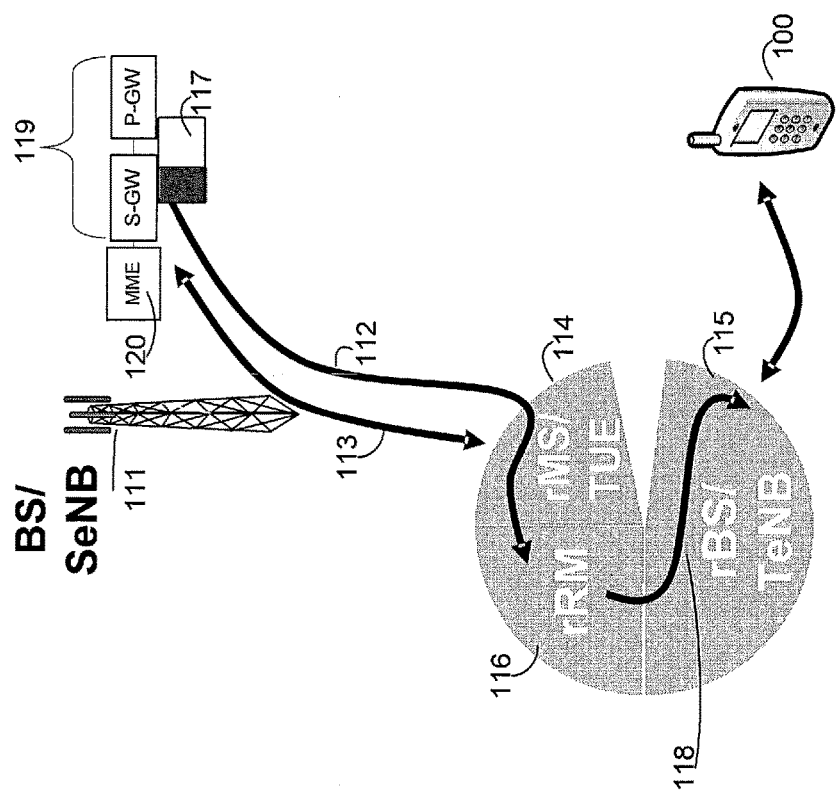
FIG. 2b is an example of a downlink message going to the stationary core and stationary base station functionality in case of a normal mode.

FIG. 2b is an example of a downlink communication message [117] going from the stationary core IP connectivity gateway/s [119] through stationary base station [111] and relay's mobile station functionality (rMS/TUE) [114] to the relay resource manager (rRM) [116]. From there it is forwarded [118] to the relay's base station functionality (rBS/TeNB) [115] to be sent to the destined mobile station [100]; when operating in normal operational mode. The message [117] is sent over a tunnel [112] from the IP connectivity gateway/s [119] to the relay resource manager (rRM) [116].

Normally, in LTE cellular networks when a mobile station connects to the core network, the mobile station gets a default bearer and an IP address assignment. When a mobile station requests a new service, the mobile station gets an assignment of another, dedicated bearer. Each assigned bearer typically has specified QoS (Quality of Service) rules such as but not limited to some or all of maximal delay, packet loss rate, GBR and queuing priority. The bearers are typically mapped to tunnels where every user packet that flows in the cellular network from the mobile station to the core and from the core to the mobile station is typically mapped into a unique tunnel being scheduled by using a tunnels-bearer assignment. In order to reflect bearer requests of the mobile station, the mobile station functionality (rMS) of the moving relay typically gets (or is provided by) bearer assignments that correspond (e.g. are same or higher in their performance and requirements) to the bearer assignments of the moving relay's connected mobile station. Typically, the backhauling link of the relay has similar or higher bearer/tunnel requirement than the bearers to which it is to relay/transfer.

Figure 3A:
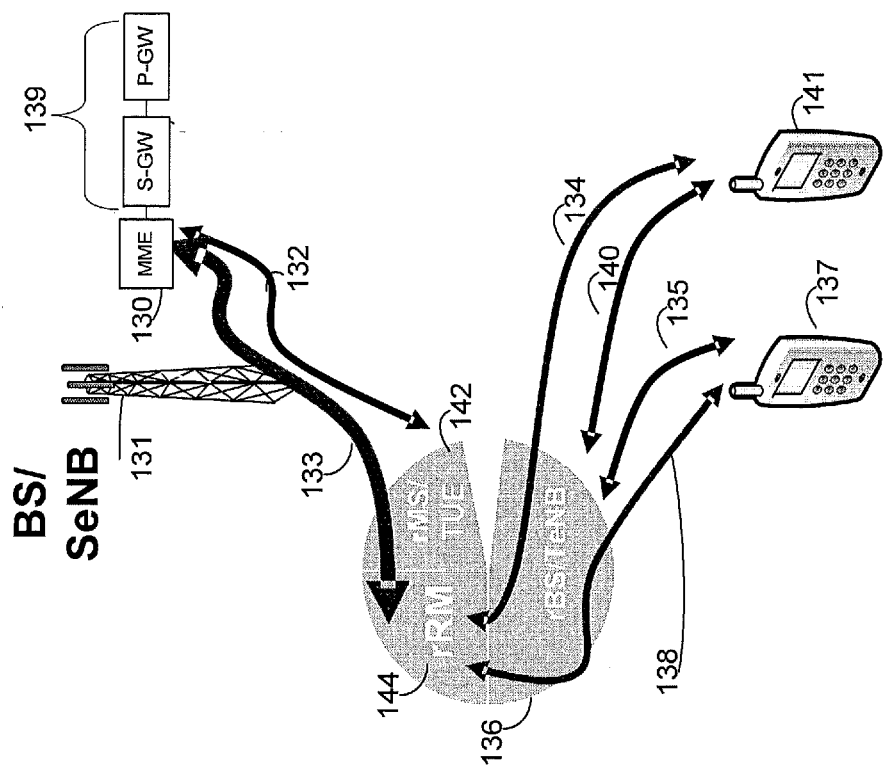
FIG. 3a is an example of communication in normal mode in a single hop scenario with two mobile stations.

FIG. 3a is an example of two mobile stations [137], [141] that connect to a moving relay using the moving relay's base station functionality [136], and the relay's mobile station functionality [142] uses its assigned tunnel [132] in order to reflect, e.g. as per the previous paragraph, its relay's base station functionality's [136] anchored mobile stations [137, 141] tunnels [140,135]; in normal mode operation.

Figure 3B:
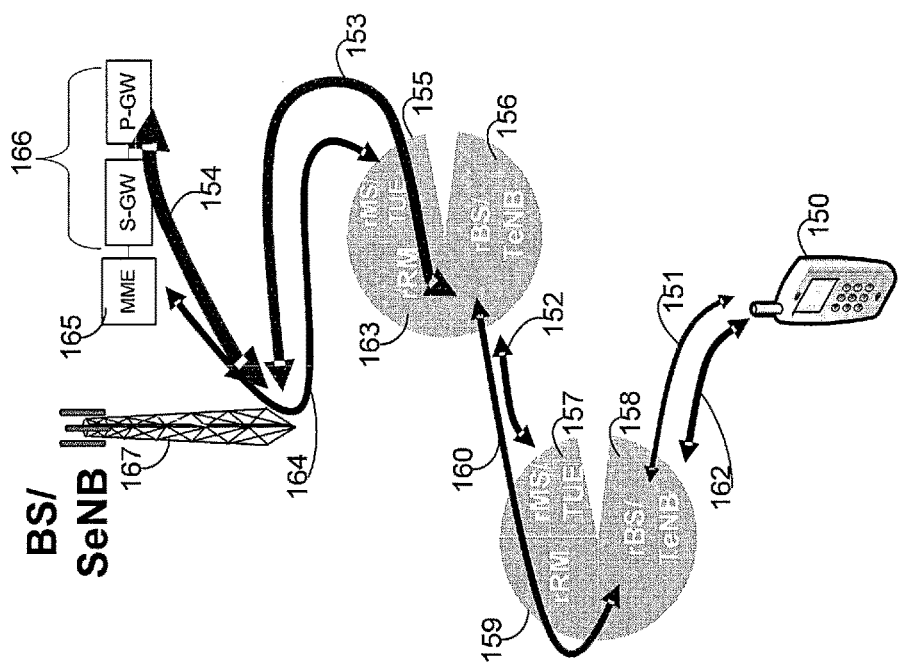
FIG. 3b is an example of communication in normal mode in a multi-hop scenario and a single mobile station.

FIG. 3b is another example of normal mode of operation for multi-hop relaying scenario, where the two relays' base station functionalities [158,156] and the static base station [167] comprises a tunnel termination point; the corresponding tunnels are [160,153,154]. These tunnels typically transfer in the upstream direction mobile station [150] data that is sent to the relay's base station functionality [158] over the air-interface [162] to the core IP connectivity gateway/s. In the downstream these tunnels typically transfer data from the IP Connectivity gateway/s [166] to the relay's base station functionality [158] to be sent over the air interface [162] to the mobile station [150].

Figure 4:
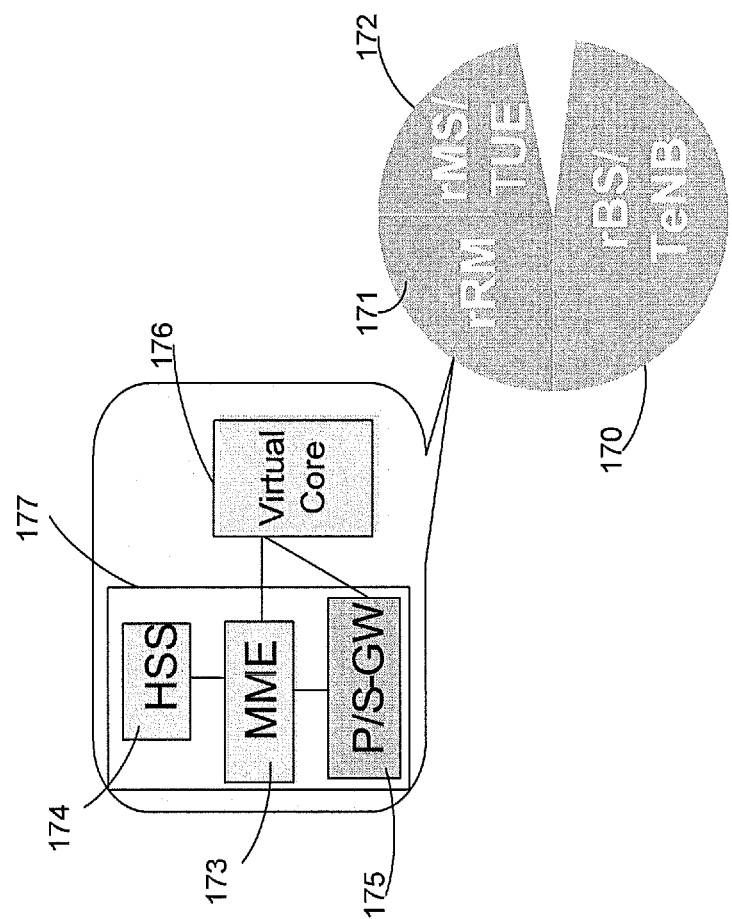
FIG. 4 is a general architecture of emergency moving relay.

FIG. 4 is a general architecture of an emergency moving relay comprising a mobile station functionality [172], base station functionality [170], a relay resource manager [171] and simulated core [177] (termed also as relay resource manager (rRM) Stand-Alone Subsystem) having simulated core network entities [173,174,175] interfaced to the virtual core subsystem [176] of the relay resource manager (rRM) [171]. The simulated core is used in order to enable the relay to operate in case of an emergency. The simulated network core comprising a IP connectivity gateway [175] (corresponds e.g. to P/S-GW entity at the core in LTE), a mobility management function (e.g. MME in LTE) [173] and an identification user data information storage and authentication function (e.g. home subscriber server—HSS in LTE) [174] that e.g. stores and shares with the mobility management entity subscriber's information.

Figure 5A:
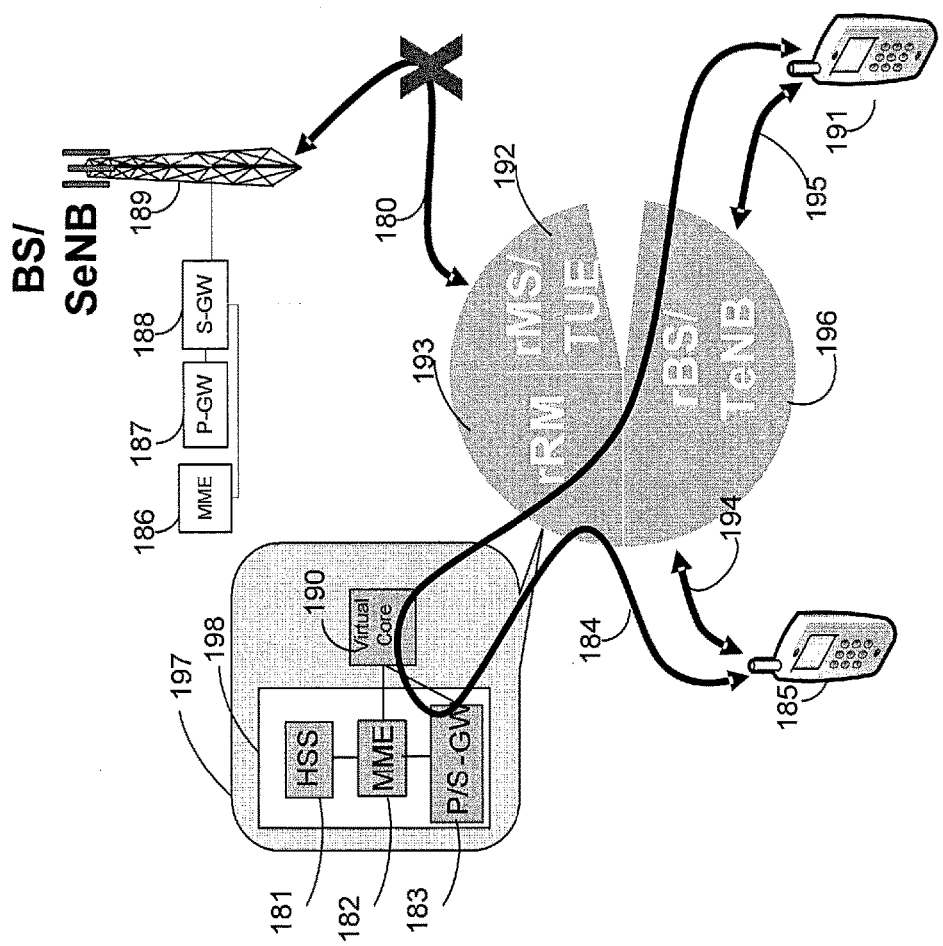
FIG. 5a is an example of two mobile stations communication in an emergency mode.

FIG. 5a is an example of an emergency moving relay operating in emergency mode. The backhauling radio link [180] between the moving relay and the static base station [189] was disconnected; as a result the local relay radio manager (rRM) [193] addresses communication data being designated to mobile stations [185,191] that are under the local relay radio manager's sub tree using the simulated network e.g. Stand Alone Subsystem as described herein.

The tunnel that was originally to be terminated at the core network P/S-GW [187,188] (the tunnel that was connecting the static network core P/S-GW [187],[188] to the relay's base station functionality (rBS) [196], whose tunnel header destination address was P/S-GW [187,188]) is terminated in the local simulated P/S-GW [183], e.g. its tunnel header destination address is set to P/S-GW[183]).

Figure 5B:
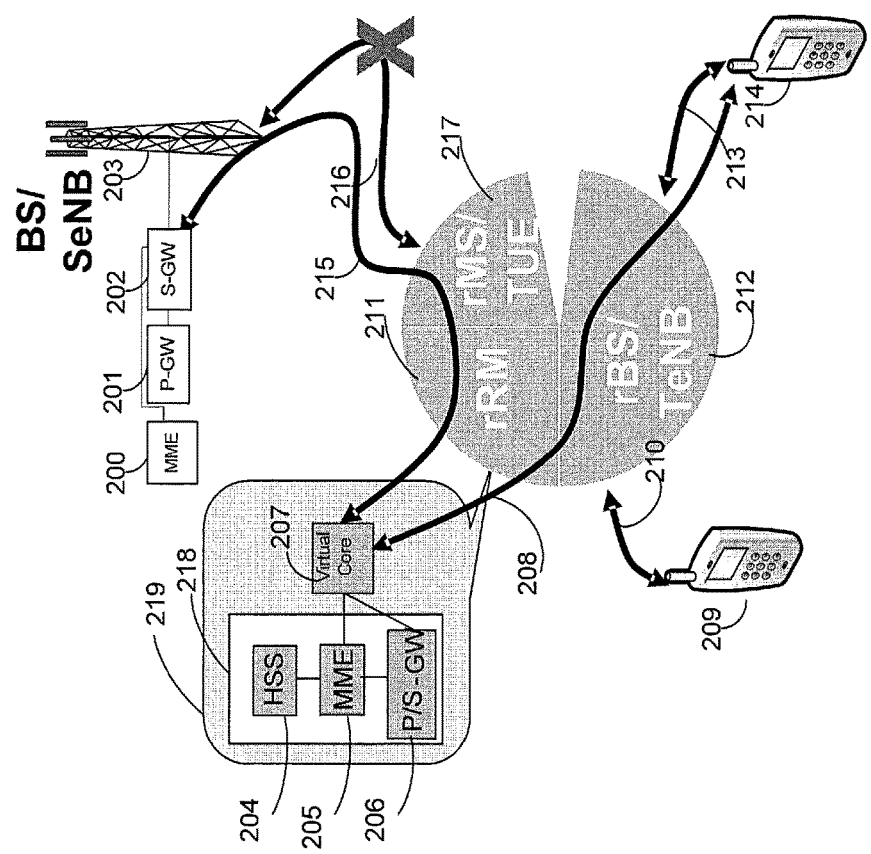
FIG. 5b is an example of two mobile stations communication in an after undo emergency mode.
Figure 5C:
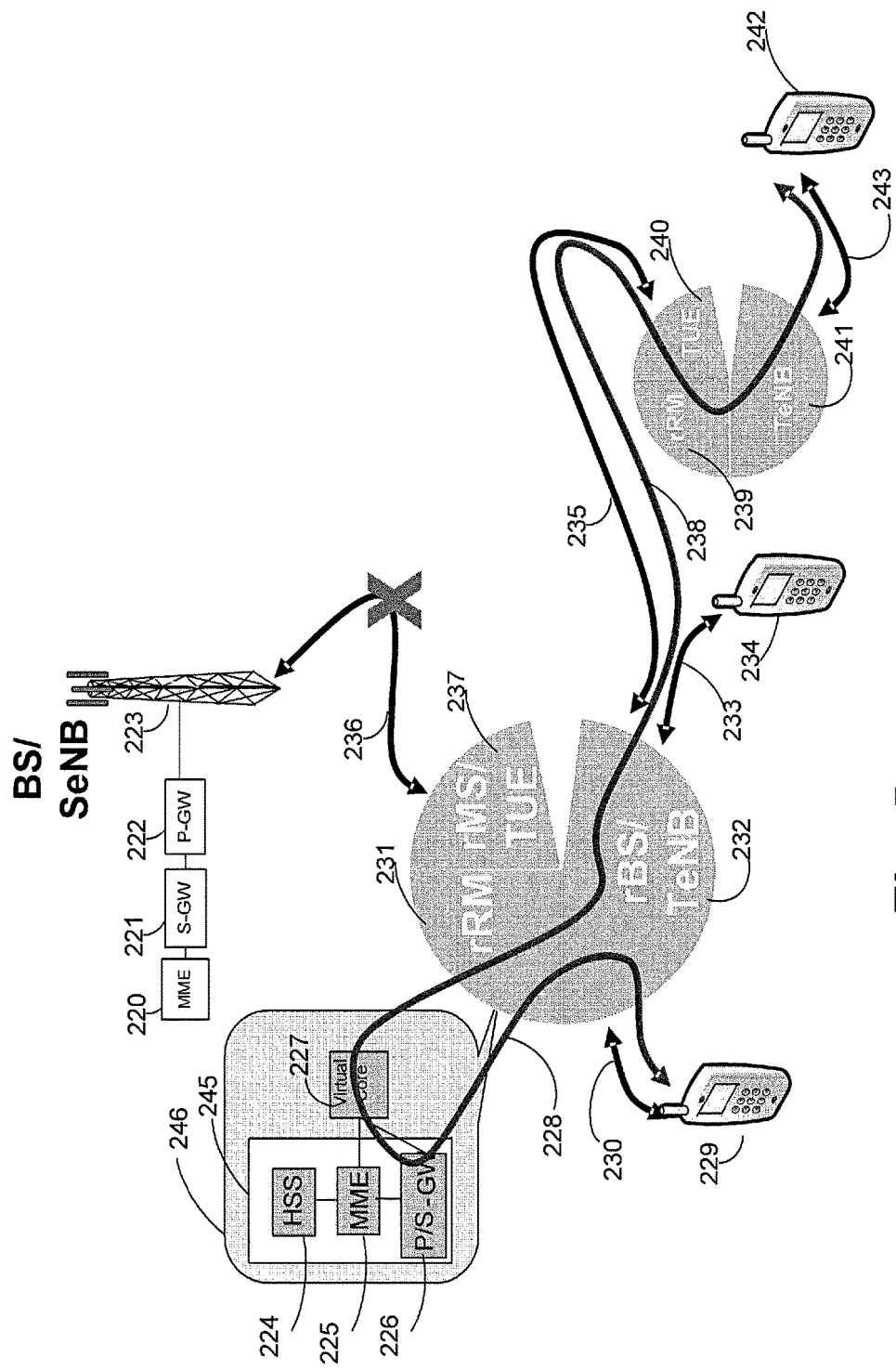
FIG. 5c is an example of three mobile stations communicating in an emergency mode in a multi-hop scenario.

FIG. 5c is an example of communication in an emergency mode in a multi-hop scenario. The tunnel that was originally to be terminated at the core network P/S-GW [187,188] is now terminated by the root of the disconnected moving relay sub-tree that simulates the core network [224,225,226]. The second moving relay [239,240,241] and the anchored mobile stations [239,234,242] are unaware of the emergency event.

FIG. 5b is an example of an undo emergency event. This undo emergency event may for example be initiated as a result of a connection being made between the relay mobile station functionality and one of: a static base station connected to static core or other relay base station functionality having active simulated core (for example, a mobile station functionality is now able to connect to the stationary core). The disconnected radio link [216] is restored and the relay radio manager [211] relays communication data back to the core network [200,201,202].

On each relay node, the sibling nodes are stored e.g. in a local table in the Routing agent. Each mobile station [229, 234, 242] associates its data streams with a bearer. Each bearer is typically associated with a traffic filter template (TFT) that includes the bearer's source address, designated node address and an optional addition of source, destination port and protocol. Typically, each bearer is uniquely marked with a Tunnel ID (TID). In the example illustrated in FIG. 5c, mobile station [242] connects to mobile station [229] e.g. using a voice over IP (VoIP) application. On a hop by hop basis, each relay node inspects the bearer establishing procedure and is operative to store a sibling node and its associated TID. In case of a disconnection [236] from the core [200,201,202] the relay resource manager (rRM) [231] functionality in the relay which resides at the head of the tree (i.e. but not limited to the relay closest to the disconnected core) is operative to locally route communication between designated nodes that are in the disconnected nodes' cluster or optionally additionally to provide services to mobile station/s in its topology tree. So, in the illustrated example, mobile station [229, 234, 242] are camped to the disconnected nodes' cluster (group of relays that are inter-connected) of relay nodes [RN1,RN2]. The relay resource manager (rRM) [231] functionality of RN1 (RN=RELAY NODE=RELAY) which resides at the top of the tree routes the communication between mobile station [229] and mobile station [242]. Furthermore, because the communication is based on GPRS tunneling, the relay resource manager (rRM) [231] can alter each tunnel, so that it can enable to communicate with the source and the destination of the tunnel, e.g. by creating an alternative using a GTP-C standard [e.g. 3GPP TS 29.274] tunnel by sending a create packet data protocol (PDP) context, Create Bearer Request to its collocated core. When an undo emergency event is received, the relay resource manager (rRM) [231] can use the same mechanism. So, the relay resource manager (rRM) may be operative for creating an alternative using a GTP-C standard [e.g. 3GPP TS 29.274] tunnel by sending a create packet data protocol (PDP) context,) to alter the local (emergency-mode) tunnels to the original tunnels (normal-mode).

Figure 6:
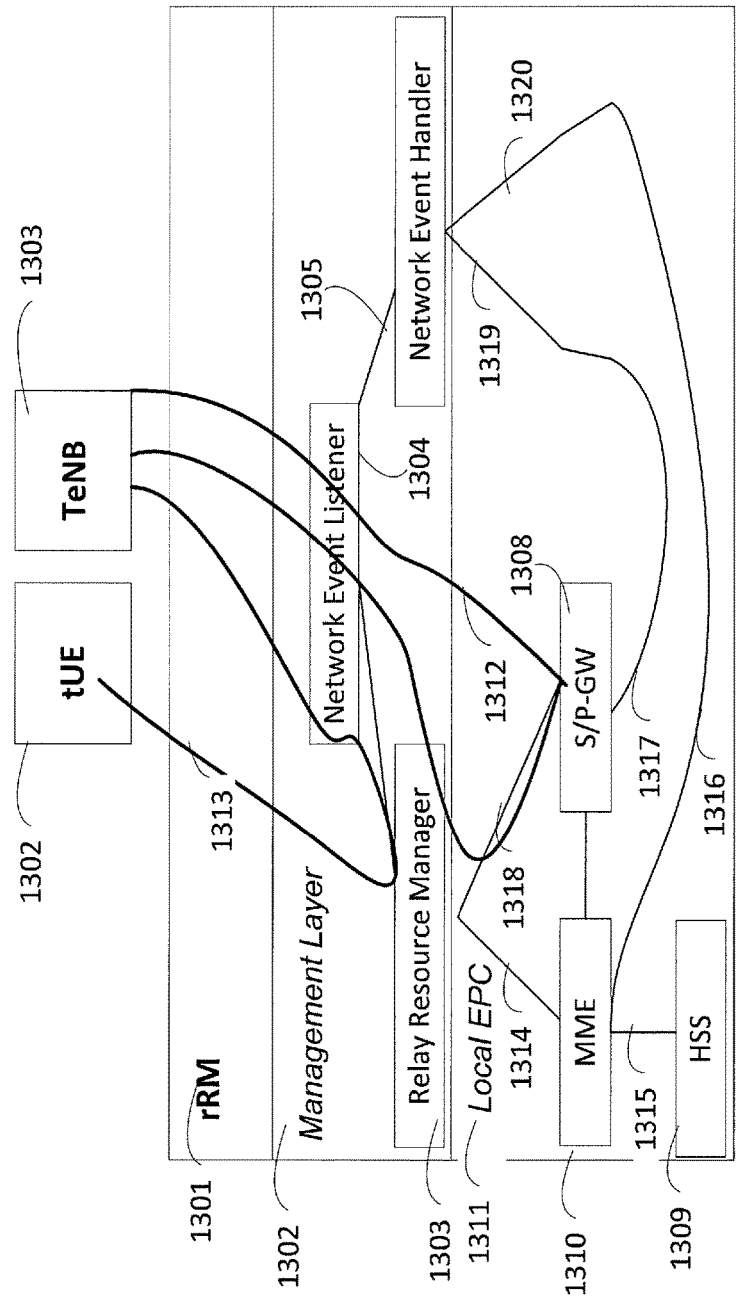
FIG. 6 is an example of message sequence when an emergency event is received and undo emergency event received.

FIG. 6 is a diagram of relay resource manager (rRM) [1301], mobile station functionality (tUE) [1302] and Base station functionality (TeNb) [1303] units communicating through the management layer [1302] of the relay resource manager (rRM) [1301], in case the communication is in a normal mode. User and control plane data [1313] goes through mobile station functionality (tUE) [1302] and Base station functionality (TeNb) [1303]. When there is an emergency event, two options may be implemented: (1) only the relay at the root (head) of the tree changes to emergency mode, all other relays retain their normal operating mode; and/or (2) all relays in the topology tree change to emergency mode, thereafter optionally connections are made between these relays in order to form one unified tree. When the relay is in emergency mode, the User and control data [1312] go through teNB[1303] rRMs management layer [1302] and the local EPC [1311] part of the relay resource manager (rRM) [1301].

An emergency event may for example comprise disconnection between the mobile station functionality and its serving base station. An emergency event may be designated when an activity in the system continues for a given amount of time, for example a disconnection from a stationary core which does not re-connect within a predetermined short time period. An emergency event may also be designated manually when an administrator raises an emergency event.

The Network event listener [1304], sniffs the standard interfaces (e.g. S1) and notifies of changes (e.g. a disconnection from the core, attachment of a user, creation of a bearer) in the network to the Network event listener's subscribers, e.g. in the illustrated example, Relay Resource Manager [1303] and the Network Event Handler [1305]. The Network Event Handler is typically responsible for synchronization of the local EPC core (e.g. Stand-Alone Subsystem) to the last known state of the stationary core in case of an emergency event, and synchronization of the stationary core state to the state of the local EPC core (Stand-Alone Subsystem) in case of an undo emergency event. It may do so, in the event of emergency, by:

a. sending, for each disconnected nodes a "create packet data protocol (PDP)" context request [1320] (e.g. GTP-C message, 3GPP TS 29.274 7.2.1) to the local simulated mobility management entity (MME) [1310] in case of emergency and b. enabling an alternate tunnel by sending a modify bearer request (GTP-C message, 3GPP TS 29.274 7.2.7) [1319] for each disconnected bearer to the local simulated P/S-GW [1308] in case of emergency.

In case of an undo emergency mode it may do the same, mutatis mutandis, e.g. for each reconnected node, send create context request to the stationary or remote-simulated network mobility management entity (MME) and send modify bearer request for each reconnected tunnel to the stationary or remote-simulated network P/S-GW.

In case of an emergency event the relay located at the root (head) of the topology tree (e.g. the relay which first caught the event or the node closest to the core) enables the local EPC core (simulated core network/Stand-alone subsystem) [1311] and functionally replaces the stationary or remote-simulated core [FIG. 5*c*, 220, 221,222]. All other relay nodes in the topology tree and their connected mobile stations are seamless to the disconnection (e.g. if no connection is to be established with any entity outside the topology tree). The disconnection may also be indicated by informing idle mode mobile stations (MSs) e.g. by changing a public land mobile network (PLMN) ID to another public land mobile network (PLMN) and broadcasting the ID to all Base station functionalities (TeNb) in the cluster. The public land mobile network (PLMN) may also indicate relevant information such as the ID of the head relay and the number relay in the cluster. It is appreciated that the term EPC refers to an all-IP mobile core network for LTE communication.

Figure 7:
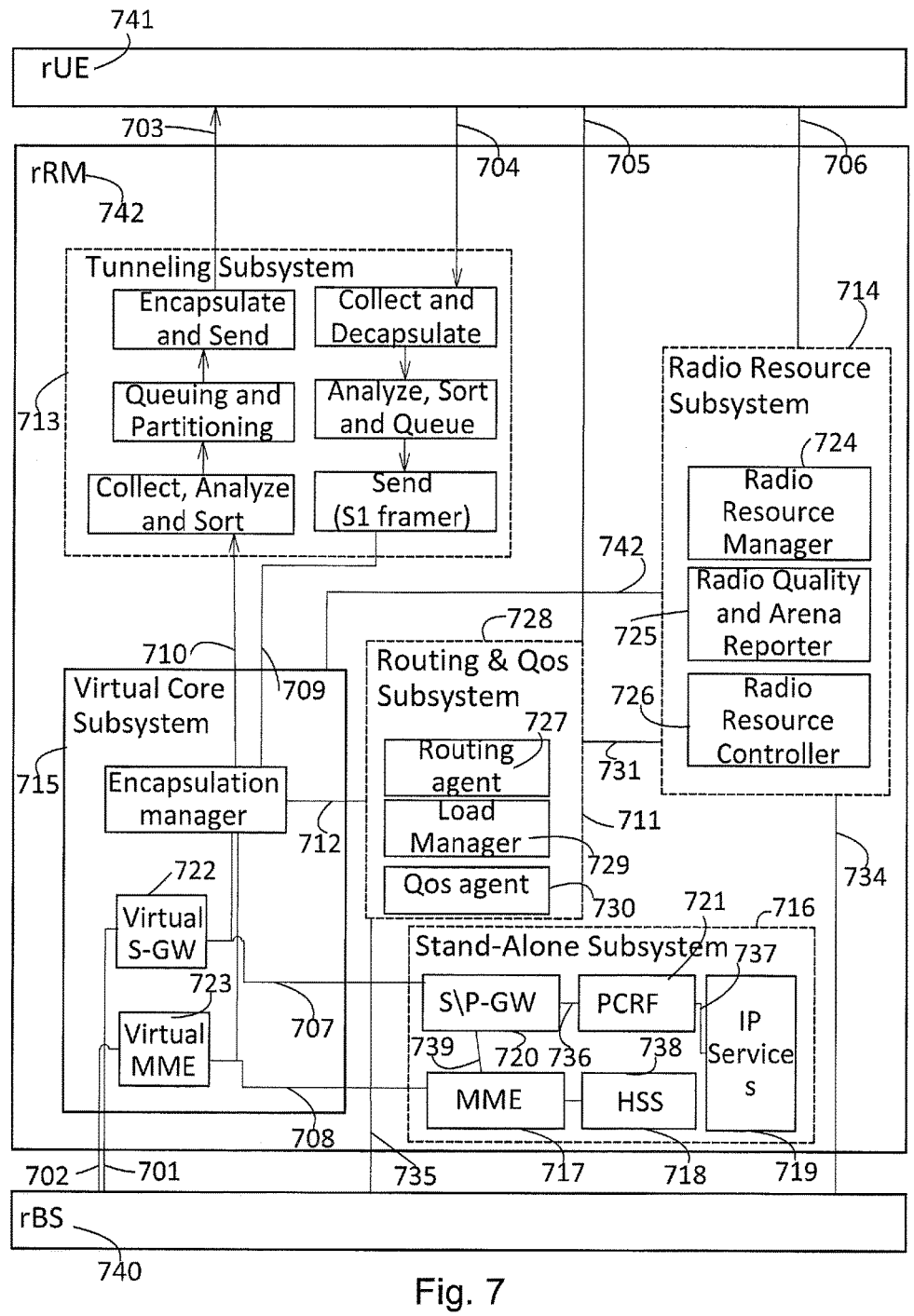
FIG. 7 is a simplified block diagram of a possible internal architecture for the emergency relay's relay resource manager (rRM) of FIGS. 2a-6.

FIG. 7 is a simplified block diagram of an example architecture for the relay resource manager (rRM) of FIGS. 2*a*-6. The terms "stand-alone subsystem", "simulated stationary network", "core functionality", mini-core and simulated core are used herein interchangeably.

As shown, the relay resource manager comprises some or all of: a Tunneling subsystem [713], Radio Resource subsystem [714] Virtual core subsystem [715] and Routing and QoS Subsystem [728], suitably coupled e.g. as shown.

The tunneling subsystem is operative for encapsulating and de-capsulating of user plane and control plane payloads over user plane bearers according to different priorities and sending the de-capsulated user plane and control plane payloads to entities in the core such as but not limited to any of: mobility management entity e.g. MME, gateways, and application servers. The tunneling subsystem typically interfaces [703, 704] with the mobile station functionality rUE [741] e.g. over a standard IP stack.

The Virtual core subsystem typically constitutes the gateway between the core (stationary) on the one hand, and various resource management subsystems and the base station functionality rBS [740] on the other hand. The Virtual core subsystem may communicate with the base station functionality rBS [740] or core (of the static network) e.g. using standard S1-MME [702,708*b*,709,710] and S1-U [701,707*b*,709,710] or proprietary management and control (M&C) over IP interface [701,707*b*,709,710] with the base station functionality rBS [740] and remote core. The Virtual core subsystem may send all or any of the S1-MME, S1-U, M&C messages to the core optionally through the Tunneling Subsystem [713].

The Encapsulation manager function of the Virtual core subsystem [715] implements a Network event listener e.g. as illustrated in FIG. 6 at reference numeral 1304 and a Network event handler e.g. as illustrated in FIG. 6 at reference numeral [1305]. The handler may use deep packet inspection techniques in order to maintain suitable statistics (such as but not limited to any or all of: all active bearers including source and destination addresses, ports, and priorities) The handler may also raise events (for example in case of a disconnection from the core). The encapsulation manager is also operative for handling (send/receive) different messages that are sent/received [712] by the Routing and QoS Subsystem to/from the core being used, for example messages to create or delete a bearer.

In addition, the Encapsulation manager function of the Virtual core subsystem [715] may optionally include functionality for exchanging information between the relay resource manager rRM that the Virtual core subsystem resides within [742] and: (1) another relay resource manager located inside another relay, and/or (2) Relay/s Server located as part of the static network. The Virtual S-GW [722] and Virtual MME [723] may have corresponding standard S-GW and MME interfaces with the base station functionality rBS [740] accordingly. If a remote core is used by the relay, the Virtual S-GW [722] and Virtual MME [723] may emulate these core functions as proxies so that the base station functionality rBS [740] works smoothly and seamlessly despite remoteness of the core.

The Routing & QoS subsystem [728] may comprise some or all of a routing agent [727], Load manager [729] and QoS Agent [730]. Routing & QoS subsystem [728] communicates with the mobile station functionality (rMS) [741] e.g. using AT Commands or any suitable proprietary interface [705]. Routing & QoS subsystem [728] communicates with the base station functionality rBS e.g. using the M&C interface [735]. Using the M&C interface the Routing and QOS subsystem may command a change in various parameters in the base station functionality rBS [740] such as PLMN, and/or may command the base station functionality rBS [740] to initiate a handover mechanism of an attached mobile station. Using the mobile station functionality (rMS) [741] interface [705] the Routing and QoS subsystem [728] may receive radio measurements of served base stations or neighboring base stations, and may send fake radio measurements to the mobile station functionality (rMS) [741] that the mobile station functionality may send to its serving base station in order to intervene with the handover mechanism. Routing and QoS subsystem [728] may register to specific access point names (APN) and/or create additional bearers.

The Load manager [729] is operative for balancing traffic loads between different relays. Load manager [729] may perform actions such as but not limited to: indicating other relay resource manager elements such as but not limited to any or all of: Radio Resource Subsystem [714], Routing agent [727], QoS agent [730] or Encapsulation manager (block of the Virtual Core Subsystem [715]) or mobile station functionality [741] or base station functionality rBS [740] or mobility management entity MME of remote core (of the static network or) that which current site loaded. Load manager [729] may also command the routing agent to try to change topology in order to gain more bandwidth (at the backhauling link), or to request that additional bandwidth be assigned to the mobile station functionality (rMS) for the backhauling link from the mobility management entity MME of remote core.

The QOS agent [730] is operative for creating bearers according to the current attached mobile stations and their bandwidth requests in case there is a need for a additional bearer due to the multi-hop mechanism.

The Radio Resource Subsystem [714] may comprise some or all of: Radio resource manager [724], Radio Quality and Arena Reporter [725] and Radio Resource Controller [726]. The radio resource subsystem [714] is operative for reducing interference between: (1) relay's access links which may be sent and received by the base station functionality rBS [740]) and relay's backhauling links which may be sent and received by the rUE (rMS) [740]; (2) relay's access links and other relays' access links; and (3) relay backhauling links and other relays' backhauling links. The Radio resource controller [726] is operative for controlling different radio resources of the mobile station functionality rUE [741] and of base station functionality rBS [740] e.g some or all of: lower base station functionality transmission power, blanking particular base station functionality resource blocks/subframe/s, request for mobile station functionality uplink grant, changing center frequency, changing bandwidth.

The Radio Quality and Arena Reporter [725] may be operative for gathering a radio measurement report indicating received power reports of the base station functionality rBS [740] and base station functionality rBS's neighboring base stations from the connected mobile stations reporting to the base station functionality rBS [740] and from the mobile station functionality rUE [741]. The radio measurement report may indicate one or more of: the mobile station functionality's serving base station's radio measurements; and/or radio measurements of mobile station functionality rUE [741]'s active set, e.g. list of neighboring base stations that mobile station functionality rUE [741] is operative to measure periodically. The Radio Resource Subsystem sends the measurement report through the interface to the Virtual Core subsystem [742], typically using the encapsulation manager, to radio resource subsystems of other relays' relay resource managers as a radio quality report. This radio quality report may be relevant for distributed radio resource management mechanisms and/or for decisions relevant to the routing agent.

The radio resource manager may receive radio quality reports from the radio resource manager's local Radio quality and arena reporter [725] and from neighboring relays' Radio quality and arena reporters. The radio resource manager may compute the level of interference between the various stations, e.g. of relays and optionally of the static network. The radio resource manager may also provide radio resource configuration recommendations to its local radio resource controller [726] and/or to its neighboring relays' radio resource controller/s through interface [742] and using the encapsulation manager of the Virtual core subsystem [715].

The Radio resource manager [714] can optionally communicate in interface [706] e.g. using AT Commands or other proprietary protocol with the mobile station functionality rUE [741]. The Radio resource manager can further optionally communicate in interface [734] e.g. using M&C protocol with the base station functionality rBS [740]. The Radio resource manager can further optionally communicate with other relays' radio resource subsystems through interface [742] e.g. using the virtual core subsystem [715] Encapsulation manager.

The Stand-alone subsystem [716], also termed herein the Simulated core network, is responsible for core packet switching & handling and for IP services. The Stand-alone subsystem [716] may serve as a local core also termed herein a mini-core since it may have less functionality than the static core does. Stand-alone subsystem [716] may also be operative for giving local services, such as local storage of maps and/or being a voice call server or/and SIP server and/or video server and/or gaming server, e.g. through the IP services function [719], in the event of handoff e.g. when the relay disconnects from the remote core (either static or part of other relay rRM) from the serving core. If such handoff occurs, the virtual core subsystem [715] may recreate all relevant PDP contexts and bearers according to the information stored on the virtual core subsystem's [715] encapsulation manager and switch the packet data to the local stand-alone subsystem [716]. When the local Stand-alone subsystem is used as an active core, and there is a need in a given situation, to re-use the remote core instead of the local core, a reverse process performed.

Tunneling Subsystem [713], Routing & QoS Subsystem [728] and Radio Resource Subsystem [714] are optional subsystems of the relay resource manager (rRM). All or any subset of these subsystems can be added to the relay resource manager (rRM) by need.

Figure 8:
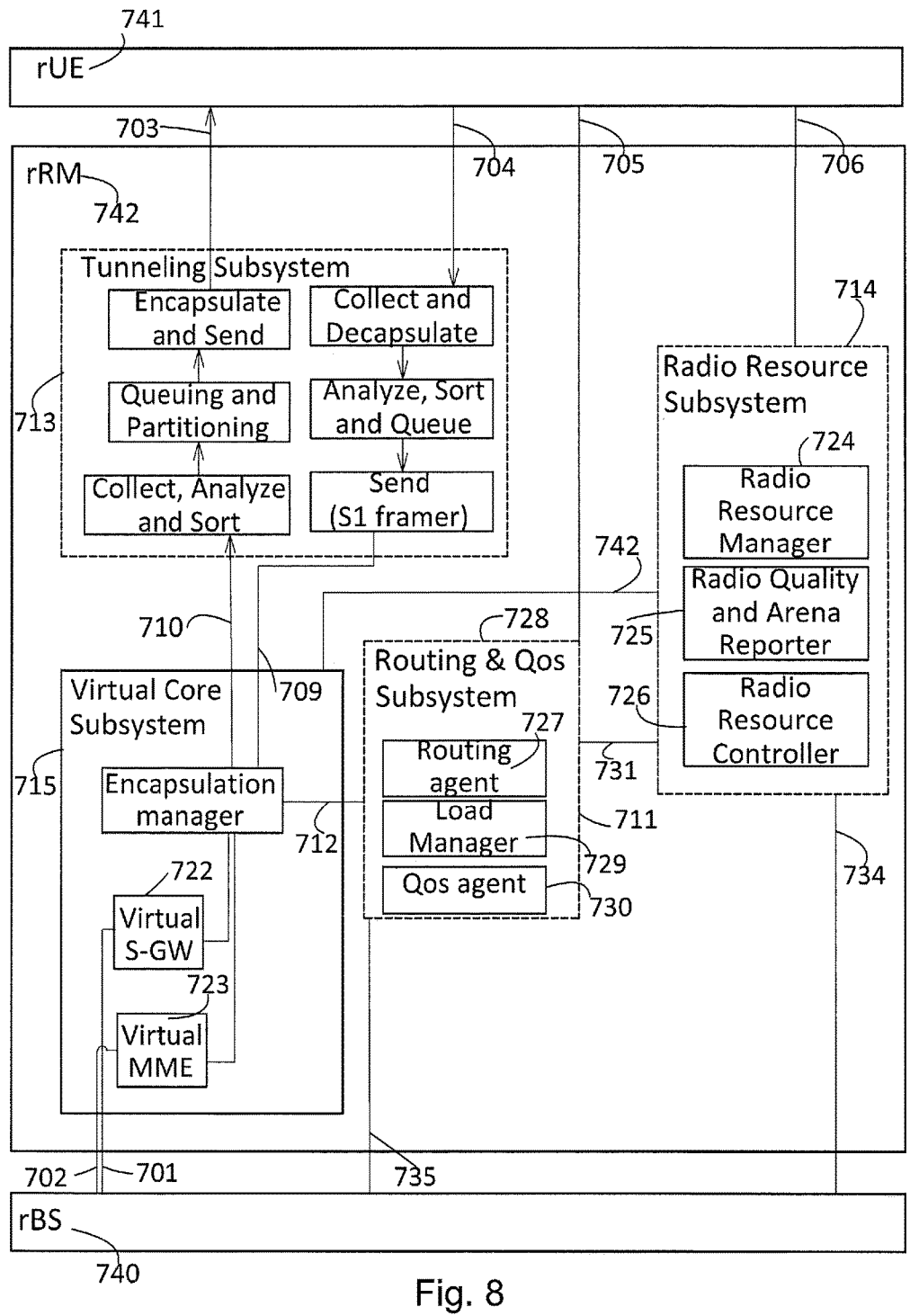
FIG. 8 is a simplified block diagram of a possible internal architecture for a non-emergency relay's relay resource manager (rRM).

FIG. 8 is a simplified block diagram of a possible internal architecture for a non-emergency relay's relay resource manager (rRM).

Figure 9:
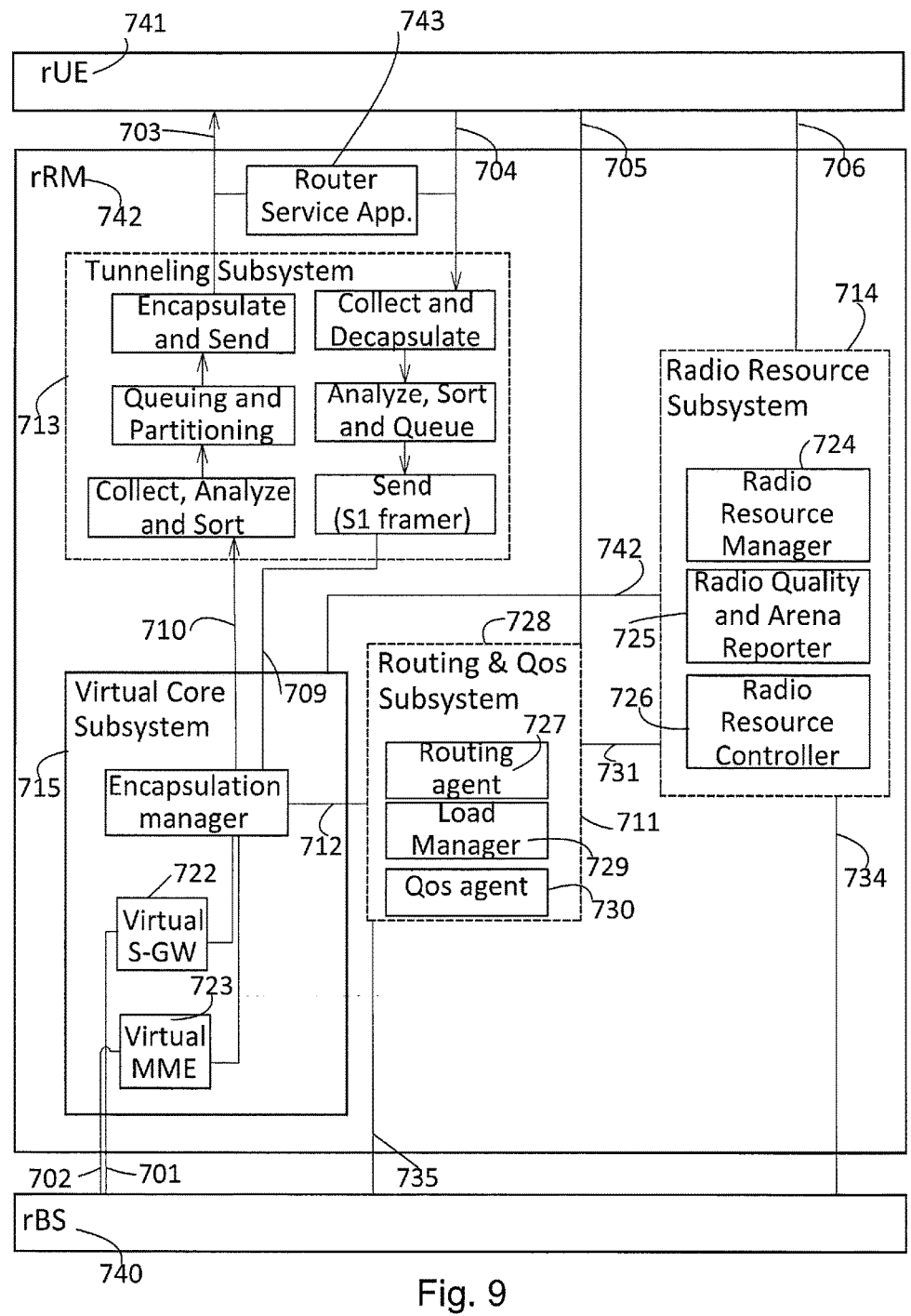
FIG. 9 is a simplified block diagram of a possible internal architecture for a non-emergency relay's relay resource manager (rRM) having an internal router service application used for multi-hop encapsulation.

FIG. 9 is a simplified block diagram of a possible internal architecture for a non-emergency relay's relay resource manager (rRM) having an internal router service application used for multi-hop encapsulation. This router service application can be added to the emergency relay to enable it to do extended tunnels for multi-hop encapsulation.

According to certain embodiments, one mobile station is connected to a core functionality of the relay resource manager and another mobile station is connected to the core element of the static network, and there is a link between these cores.

If a mobile station that is attached to a stationary base station or even a standard phone communicates with a mobile station that is attached to the core through several relays e.g. as depicted in FIG. 3b, the mobile station attached to a stationary base station may connect e.g. using conventional interfaces to the P-GW and from there by hopping through [164] the static base station SeNB [167], the first relay node TUE[155], relay resource manager rRM [163] and base station functionality TeNB [156]. The second relay's mobile station functionality TUE [157], the relay resource manager rRM [159] and the base station functionality TeNB [158] are typically able to communicate with the mobile station [150].

Any suitable IP connectivity gateway may be used herein, not being limited to what is specifically shown and described herein, such as but not limited to one of: an IP-connectivity GW in LTE; one of a P-Gateway, S-Gateway, P/S-Gateway and Access-Gateway; in 3G GGSN, an SGSN, in WiMAX, an ASN-Gateway in CSN;

Any suitable mobility management entity may be used herein, not being limited to what is specifically shown and described herein, such as but not limited to one of: an LTE MME, a 3G RNC, and a WiMAX ASN.

Figure 10:
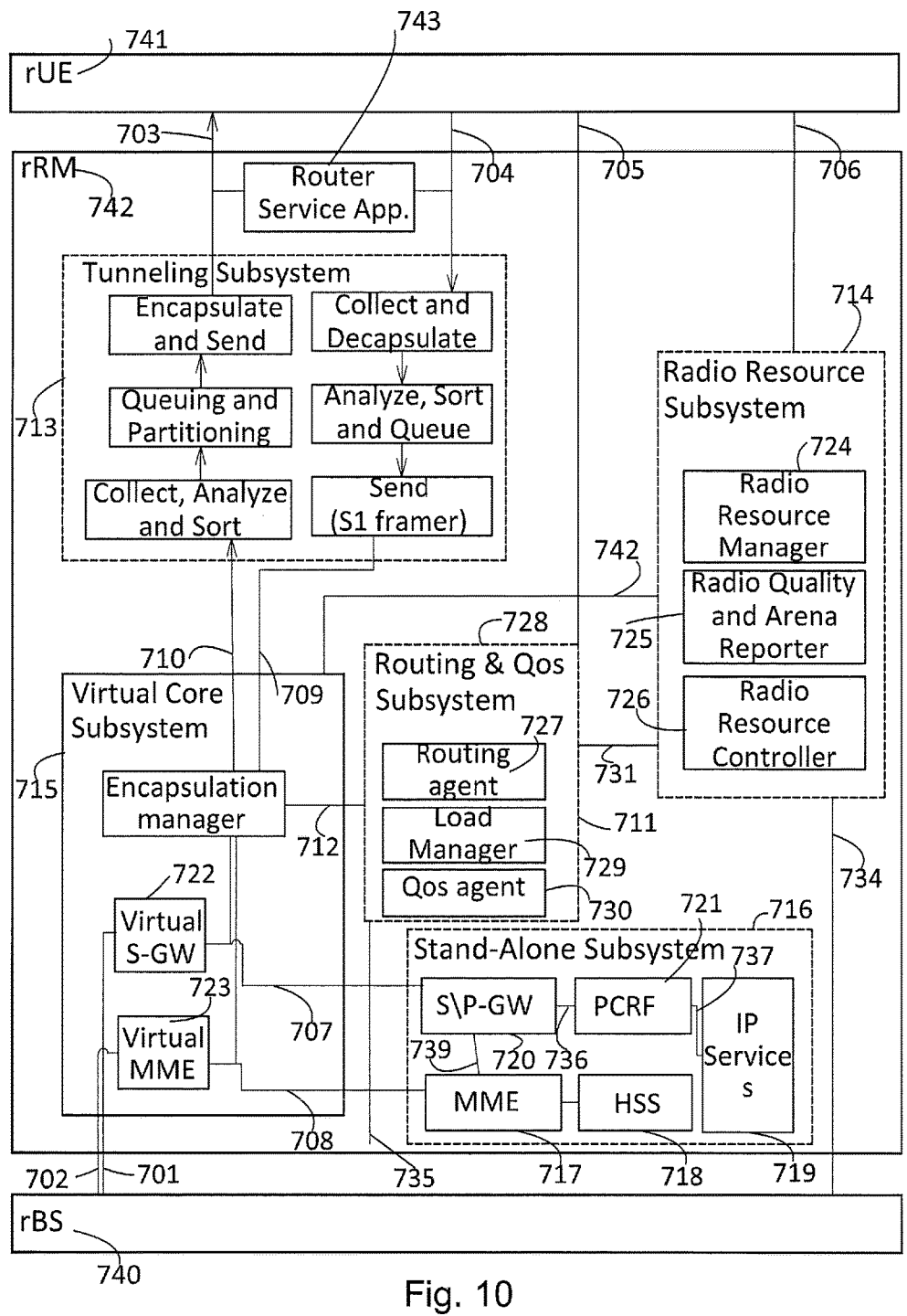
FIG. 10 is a simplified block diagram of a possible internal architecture for a emergency relay's relay resource manager (rRM) [742] having an internal router service application [743] used for multi-hop encapsulation. The addition of the router service application [743] to the rRM enables the emergency relay to effect extended tunnels for multi-hop encapsulation. Router service application [743] can be implemented as a software application, or alternatively as a hardware router.

FIG. 10 is a simplified block diagram of a possible internal architecture for a emergency relay's relay resource manager (rRM) [742] having an internal router service application [743] used for multi-hop encapsulation. The addition of the router service application [743] to the rRM enables the emergency relay to do extended tunnels for multi-hop encapsulation. It should be noted that the router service application [743] can be implemented as a software application, or alternatively as a hardware router.

Figure 11:
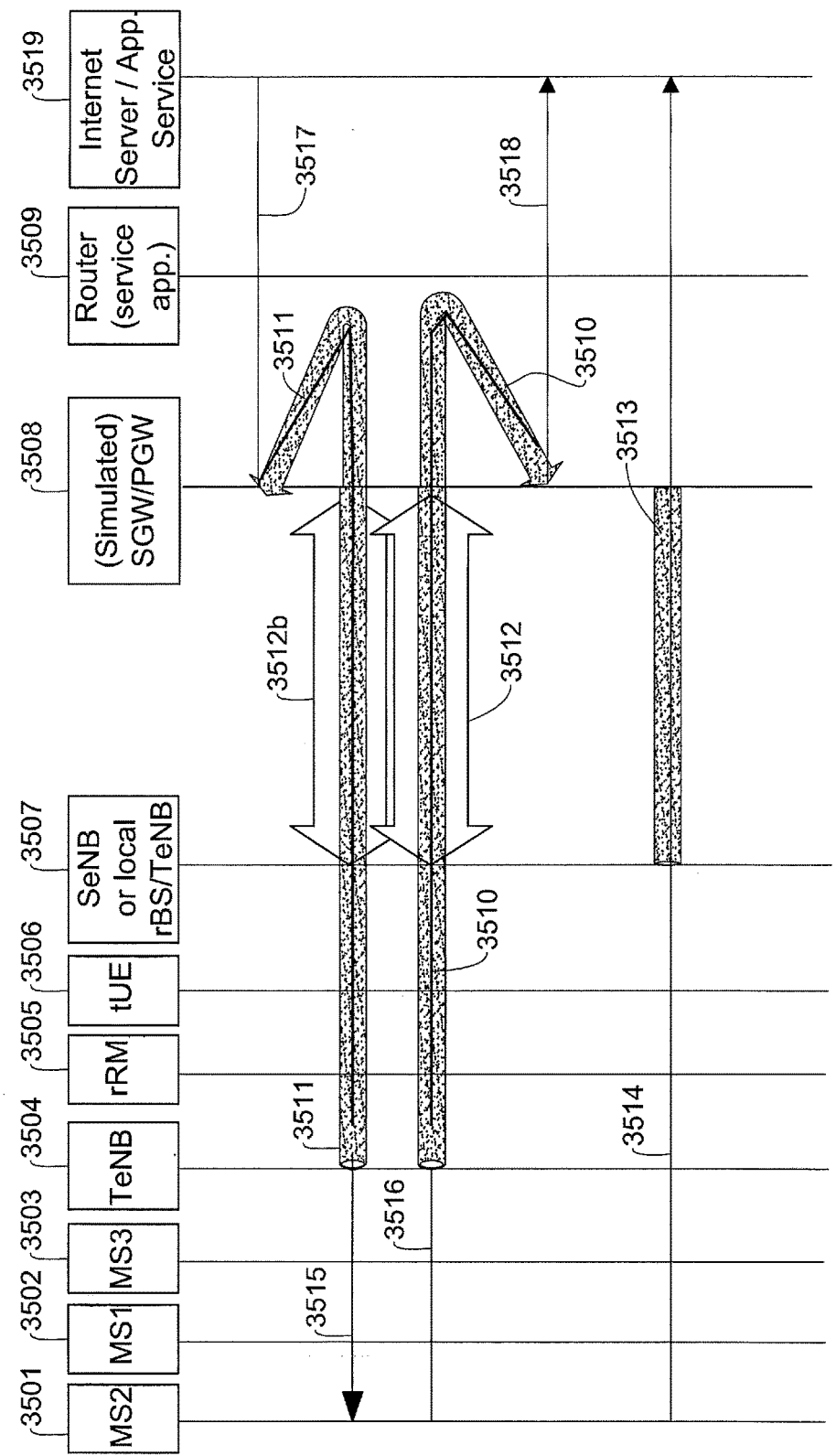
FIG. 11 describes an example of the encapsulation delivery steps of data on the route through relay and network for the case of single relay, according to one embodiment of the present invention.

FIG. 11 describes an example of encapsulation delivery steps of data on the route through relay and stand-alone relay for the stand-alone relay and relay of FIG. 5c, some or all of which, suitably ordered e.g. as shown, may be performed according to one embodiment of the present invention.

The width of the GPRS tunnel typically indicates that it is a tunnel inside a tunnel, e.g. as represented by a small dark-gray arrow (such as arrow 3510 in FIG. 6) inside a large, light-gray arrow (such as arrow 3512 in FIG. 11). This follows a convention similar to the 3GPP relay convention e.g. as shown in 3GPP TR 36.806's figure numbers 4.2.2-2 and 4.2.3-4.

Figure 12:
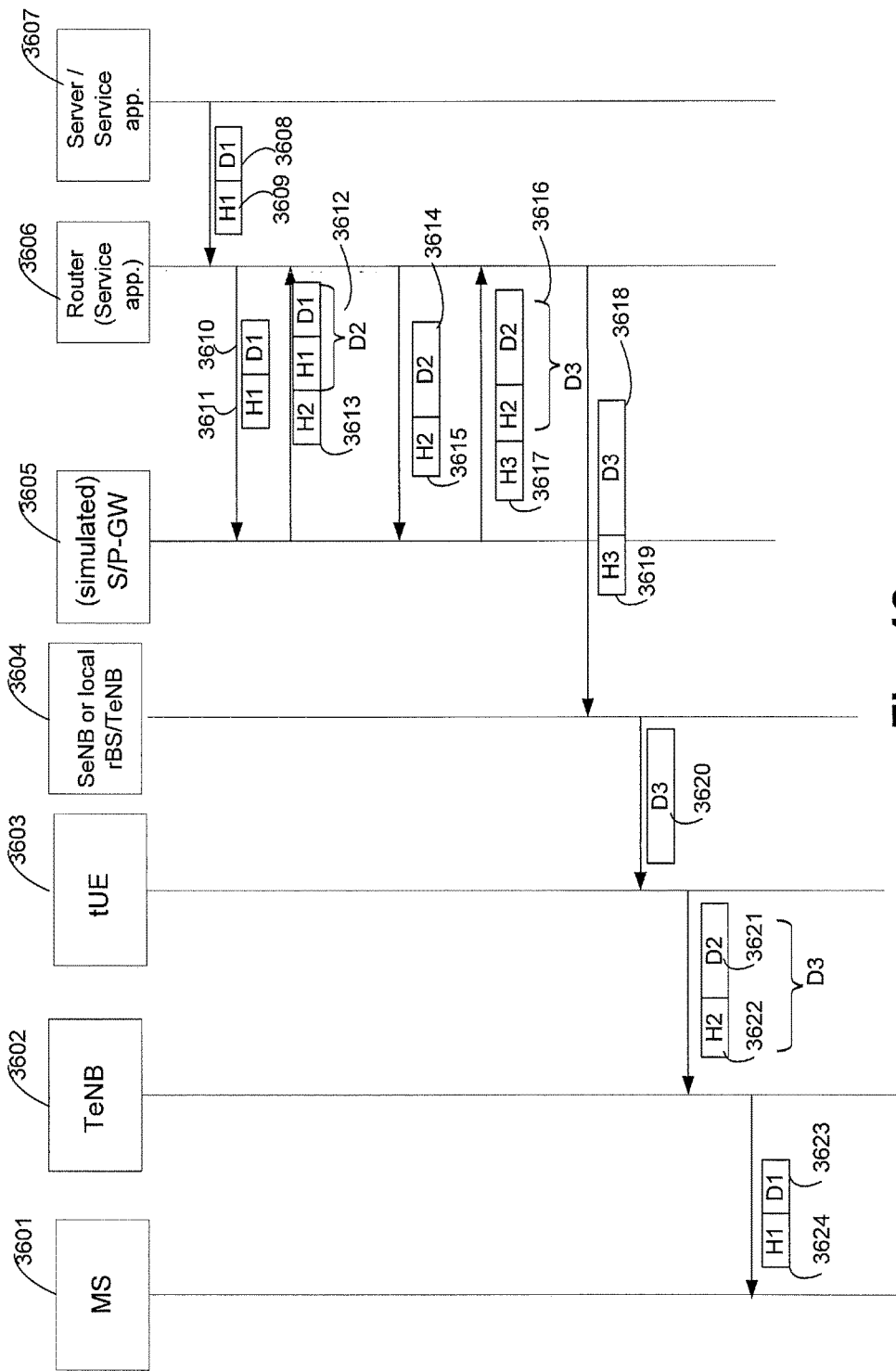
FIG. 12 is a sequence diagram explaining encapsulation delivery steps for multi-hop relay applications, according to one embodiment of the present invention.

FIG. 12 is a sequence diagram explaining encapsulation delivery steps from a MS to a stand alone service for multi-hop relay through relay and stand-alone relay for the stand-alone relay and relay of FIG. 5c, according to one embodiment of the present invention.

FIG. 5c, as described, illustrates an example scenario of three mobile stations, two of which use Relay1 in order to connect to the static network. FIG. 11 describes an example of encapsulation delivery steps suitable for the scenario of FIG. 5c.

FIG. 12 shows stages of an example encapsulation process, some or all of which, suitably ordered e.g. as shown, may be performed.

Mobile station MS1 (3502) typically sends data to the Base station functionality (TeNB) (3504) as IP traffic (3516). The source address typically comprises the IP address provided to mobile station MS1 during its registration and the destination address may be, for example, a server on a global network not served by the local core, e.g. Internet (3519), or other mobile station, or static station, or other server (such as but not limited to video broadcast, voice, SIP, gaming).

The Base station functionality (TeNB) (3504) typically encapsulates the data in a GTP tunnel (3510) with the source address typically comprising or being the address given to the Mobile station functionality (tUE) (3506) when the Mobile station functionality registered to the mobile relay network APN and used to encapsulate Base station functionality (TeNB) (3504) communication data. The destination address is typically that of the gateway (e.g. P/S-GW) (3508) that was assigned to mobile station MS1 (3502).

The data is typically sent via the LTE air interface from the Mobile station functionality (tUE) (3506) to the stationary base station SeNB (3507).

Typically, the Stationary base station (SeNB) then encapsulates the data in another GTP tunnel (3512) with the source address typically comprising the IP address of the Stationary base station (SeNB) (3507). The IP address of the Stationary base station (SeNB) may be either static or dynamic and the destination address typically comprises the gateway (e.g. P/S-GW) (3508) that was assigned to the Mobile station functionality (tUE) (3506).

The data is typically received by the gateway (e.g. P/S-GW) (3508) that initially de-capsulates the GTP tunnel from the Stationary base station (SeNB) (512). The resulted packet typically comprises a tunneled (3510) packet forwarded out to the router function (3509).

Typically, the destination address for the resulted packet is now the gateway (e.g. P/S-GW) (3508) of mobile station MS1 (3502), and the router therefore redirects the resulted packet (3510), typically back to the gateway (e.g. P/S-GW) (3508), e.g. the same gateway (e.g. P/S-GW) the packet came from, or another gateway (e.g. P/S-GW), if the two assigned gateways (e.g. P/S-GWs) for Mobile station functionality (tUE) and for mobile station MS1 are different.

The gateway (e.g. P/S-GW) (3508) now typically de-capsulates the second GTP tunnel (3510) and forwards the IP traffic (3516) to the router (3509) again (518).

The destination address may be the original destination address of the packet (in the illustrated example a server on the Internet (3519)). The router (3509) may then forward the packet to the Internet server (3519).

In the reverse direction, the process again typically comprises bouncing of the packet e.g. between the gateway (e.g. P/S-GW) (3508) and the router (3509).

A packet sourced from an Internet server (3519) and addressed to the IP address of mobile station MS2 (3501), may be forwarded to the router (3509) from the Internet.

The router then typically forwards it to the gateway (e.g. P/S-GW) (3508) that is presented to the network as a router. The mobility management entity that is part of the core in which the gateway (e.g. P/S-GW) or other gateway resides typically holds a list matching IP addresses for mobile stations with the base stations that serve these mobile stations. The gateway (e.g. P/S-GW) then typically encapsulates the traffic in a GTP tunnel and sends the traffic directly or via router to the relevant mobile station. It is appreciated that gateway (e.g. P/S-GW) is merely an example and throughout, mutatis mutandis, other gateways may be employed.

In the illustrated embodiment, the record of the IP addresses matching list for mobile station MS1 may be the IP address of the mobile relay (the Mobile station functionality (tUE) (506) IP address). The GTP packet (511) may then be forwarded to the router function (3509) that may bounce it back to the gateway (e.g. P/S-GW) (3508).

The gateway (e.g. P/S-GW) (3508) now typically receives a packet with Mobile station functionality (tUE) (3506) destination address; its matching list record for the Mobile station functionality (tUE) (3506) is Stationary base station (SeNB) (3507). The gateway (e.g. P/S-GW) (3508) may encapsulate the packet again in a GTP tunnel (3512*b*) addressed to Stationary base station (SeNB) (3507).

The router receiving the packet may forward it over GTP tunnel (512*b*) to the Stationary base station (SeNB) (3507) which may de-capsulate the packet and send the decapsulated packet over the air interface to Mobile station functionality (tUE) (3506). The Mobile station functionality (tUE) (3506) typically passes the decapsulated packet on to the Base station functionality (TeNB) (3504) that, typically, de-capsulates the second GTP tunnel (3511) and forwards the packet over the air interface (3515) to the packet's final destination e.g. mobile station MS2 (3501).

For the router function to operate in these scenarios and be able to correctly forward packets, a suitable PDN (Packet Data Network) and address assignment may be used:

TUEs (e.g. mobile station functionalities within relay/s) typically use specific APN and register to separate PDN that has a specific IP address pool (as an example (10.0.X.X).

Standard/static base stations that connect directly to core and gateway (e.g. P/S-(GW) are typically assigned addresses from a different pool (e.g. 10.1.X.X).

Standard mobile stations typically use a different APN and PDN and are typically assigned an IP address from a different pool (e.g. 85.X.X.X).

The following configuration now allows convenient configuration of the router function to operate correctly and forward packets as needed.

The bouncing back of functions to the gateway (e.g. P/S-GW) may be performed by the router itself or performed internally in the gateway (e.g. P/S-GW) as the gateway (e.g. P/S-GW) recognizes the destination IP address as its own address (this may be gateway (e.g. P/S-GW) implementation dependent).

The above-described scheme may be extended to cover scenarios where the mobile station is connected to the core network via multiple relays (e.g. multi-hop cellular network).

FIG. 12 is a sequence diagram explaining an example encapsulation delivery method for multi-hop relay applications. The mobile stations typically constitute or include a subnet of mobile stations; the Base station functionality (TeNB) and reNB typically share the same subnet address, different from the subnet address of the stationary core which comprises elements: Stationary base station (SeNB) (or local rBS/TeNB) [3604], (simulated) S/P-GW[3605] and Router (service app) [3606].

From the point of view of the core, Base station functionality (TeNB) is typically addressed by using the ip address of Mobile station functionality (tUE). This may be effected by using a NAT application or by sharing the same ipv6 network prefix and using a stateless address auto-configuration in the IP address allocation of the Mobile station functionality (tUE). The Router (service app) [3606] is typically configured to send packets that are addressed to the ip address (subnet) that belongs to mobile stations and relay mobile stations to the (simulated) gateway S/P-GW [3605]. The Router (service app) [3606] typically serves as the default gateway of the Stationary base station (SeNB) (or local rBS/TeNB) [3604], Server (service app) [3607] and the (simulated) S/P-GW[3605]. The Stationary base station (SeNB) and the router typically have routable address; the router is operative to communicate with the Stationary base station (SeNB) without involving the S/P-GW.

A server typically sends payload data D1 [3608], with a header that indicates the server as the source address and mobile station MS as the designated address, to the default gateway [3606]. The router sends payload data [3610] and header [3611] on to the (simulated) gateway S/P-GW [3605]. The (simulated) S/P-GW [3605], as part of the GPRS tunneling, takes the payload data [3610] and header [611], encapsulates them as payload D2 [3612], adds a header [3613] which indicates the (simulated) S/P-GW [3605] as the source address and the serving base station [3602] of the Base station functionality (TeNB) [3602] as the destination address, and sends the playload and header to the default gateway [3606].

Base station functionality (TeNB)'s IP address typically belongs to the addresses that are configured to be routed to the (simulated) S/P-GW [3605]. The router sends the payload data [3614] and header [3615] to the (simulated) S/P-GW [3605]. Base station functionality (TeNB) is typically addressed through Mobile station functionality (tUE) so as part of, e.g., the GPRS tunneling protocol the gateway S/P-GW typically adds another header H3[3617] indicating the source as gateway S/P-GW and the destination as the serving base station of Mobile station functionality (tUE) and Stationary base station (SeNB). The original header (H2) and data (D2) is typically loaded as a payload D3 [3618].

The gateway (e.g. P/S-GW) typically sends payload [3616] and header [3617] to the router. As the subnet of Stationary base station (SeNB) belongs to the stationary subnet the router typically sends the payload [3618] and header [3619] without involving the S/P-GW. As part of the GPRS (e.g.) tunneling protocol the Stationary base station (SeNB) typically removes the header H3 [3619] and sends payload data D3 [3620] to mobile station functionality (tUE) [3603]. Mobile station functionality (tUE) sends the payload data D3, which typically comprises, as above, header 112 [3622] having the designated address of Base station functionality (TeNB) [3602] and payload data D2 [3621], to Base station functionality (TeNB). Base station functionality (TeNB) receives H2[3622] and D2 [3621] and as part of the GPRS protocol removes the header H2[3622] and sends the payload data D2[3621] to mobile station MS[3501]. Mobile station MS [3501] receives payload data which as above, typically includes the original header H1[3624] and payload data D1 [3623] that was originally sent from the Server H1[3609] and D1[3608]. In the other direction, the process is similar just in reverse.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A non-transitory tangible computer readable medium having computer readable program code embodied therein, the computer readable program code adapted to be executed to implement an emergency communication method for a cellular communication system forming part of a cellular communication network having a core element, the method comprising:
    providing at least one relay including:
        at least one base station functionality serving at least one mobile station;
        at least one mobile station functionality; and
        a relay resource manager operative to manage at least one resource pertaining to at least one of the base station functionality and mobile station functionality, all co-located; and
    providing the relay resource manager with a core functionality operative, selectably, to take over at least one core function performed by the core element, for the at least one mobile station served by the base station functionality, wherein:
        the core functionality is also operative, selectably, to hand back the at least one functionality taken over from the core element, and
        the handing back by the core functionality is performed by at least one of: manual operation and autonomous operation.

2. The non-transitory tangible computer readable medium according to claim 1, wherein the core functionality takes over the functionality in real time and without disrupting ongoing communication over the network.

3. The non-transitory tangible computer readable medium according to claim 2, wherein the core functionality's taking over is performed by the autonomous operation.

4. The non-transitory tangible computer readable medium according to claim 3, wherein the autonomous operation is performed by a command originated by at least one of: an internal element of the relay, an internal element of a relay other than the relay, an element of the cellular communication network and an element external to the cellular communication network.

5. The non-transitory tangible computer readable medium according to claim 2, wherein the core functionality's taking over is performed by manual operation.

6. The non-transitory tangible computer readable medium according to claim 1, wherein the core functionality comprises connecting between at least a pair of mobile stations characterized in that at least one core function pertaining to the pair which was previously performed at the core element is now performed by the core functionality of the relay resource manager.

7. The non-transitory tangible computer readable medium according to claim 1, wherein the core functionality comprises connecting between:
at least one mobile station characterized in that the core element previously performed at last one core function for the mobile station whereas the core functionality of the relay resource manager now performs the core function for the mobile station; and
at least one additional mobile station characterized in that the core element still performs the at last one core function for the additional mobile station's core.

8. The non-transitory tangible computer readable medium according to claim 1, wherein the at least one core function comprises connecting between at least one mobile station characterized in that the core element previously served as the mobile station's core whereas the core functionality of the relay resource manager now serves as the mobile station's at least one core function and an application service server.

9. The non-transitory tangible computer readable medium according to claim 1, wherein the core functionality's handing back is performed by the autonomous operation.

10. The non-transitory tangible computer readable medium according to claim 9, wherein the autonomous operation is performed by a command originated by at least one of: an internal element of the relay, an internal element of a relay other than the relay, an element of the cellular communication network and an element external to the cellular communication network.

11. The non-transitory tangible computer readable medium according to claim 1, wherein the core functionality's hand-back of the at least one core function from the core element includes handing back at least one connectivity gateway function of the core element's functioning.

12. The non-transitory tangible computer readable medium according to claim 1, wherein the core functionality's hand-back of the at least one core function from the core element includes handing back at least one security management function of the core element's functioning.

13. The non-transitory tangible computer readable medium according to claim 1, wherein the core functionality's handing back is performed by manual operation.

14. An emergency communication method for a cellular communication system forming part of a cellular communication network having a core element, the method comprising:
providing at least one relay including:
at least one base station functionality serving at least one mobile station;
at least one mobile station functionality; and
a relay resource manager operative to manage at least one resource pertaining to at least one of the base station functionality and mobile station functionality, all co-located; and
providing the relay resource manager with a core functionality operative, selectably, to take over at least one core function performed by the core element, for the at least one mobile station served by the base station functionality, wherein:
the core functionality is also operative, selectably, to hand back the at least one functionality taken over from the core element, and
the handing back by the core functionality is performed by at least one of: manual operation and autonomous operation.

15. The emergency communication method according to claim 14, wherein the core functionality hands back the at least one core function without disrupting ongoing communication over the network.

16. The emergency communication method according to claim 14, wherein the core functionality's take-over of the at least one core function from the core element includes taking over at least one mobility-management function in the core element's functioning.

17. The emergency communication method according to claim 16, wherein the at least one mobility-management function comprises at least one of: LTE MME, 3G RNC and WiMAX ASN.

18. The emergency communication method according to claim 14, wherein the core functionality's take-over of the at least one core function from the core element includes taking over at least one policy-management and control function in the core element's functioning.

19. The emergency communication method according to claim 14, wherein the core functionality's take-over of the at least one core function from the core element includes taking over at least one QoS-management function of the core element's functioning.

20. A cellular communication system forming part of a cellular communication network having a core element, the system comprising:
at least one relay including:
at least one base station functionality serving at least one mobile station;
at least one mobile station functionality; and
a relay resource manager operative to manage at least one resource pertaining to at least one of the base station functionality and mobile station functionality, all co-located, wherein the relay resource manager includes a core functionality operative, selectably, to take over at least one core function performed by the core element, for the at least one mobile station served by the base station functionality, wherein:
the core functionality is also operative, selectably, to hand back the at least one functionality taken over from the core element, and
the handing back by the core functionality is performed by at least one of: manual operation and autonomous operation.

21. The cellular communication system according to claim 20, wherein the handing back is done in response to mobile station functionality connected to one of: other relay base station functionality or static base station.

* * * * *

UNITED STATES PATENT AND TRADEMARK OFFICE
CERTIFICATE OF CORRECTION

PATENT NO. : 10,257,767 B2
APPLICATION NO. : 15/863151
DATED : April 9, 2019
INVENTOR(S) : Adi Schwartz et al.

Page 1 of 1

It is certified that error appears in the above-identified patent and that said Letters Patent is hereby corrected as shown below:

On the Title Page

Column 1, Under Item (63) should read:
(30) Foreign Application Priority Data
Feb. 12, 2012 (IL) ......................................218046

Signed and Sealed this
Twenty-fifth Day of June, 2019

Andrei Iancu
*Director of the United States Patent and Trademark Office*